(12) United States Patent
Ueguri

(10) Patent No.: US 10,649,645 B2
(45) Date of Patent: May 12, 2020

(54) ELECTRONIC APPARATUS AND METHOD FOR CONTROLLING THE SAME

(71) Applicant: CANON KABUSHIKI KAISHA, Tokyo (JP)

(72) Inventor: Toshiaki Ueguri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 15/951,015

(22) Filed: Apr. 11, 2018

(65) Prior Publication Data

US 2018/0348982 A1 Dec. 6, 2018

(30) Foreign Application Priority Data

Jun. 5, 2017 (JP) .................. 2017-111125

(51) Int. Cl.
| | |
|---|---|
| *G06F 3/0488* | (2013.01) |
| *G06F 3/041* | (2006.01) |
| *G06F 3/0484* | (2013.01) |
| *H04N 5/232* | (2006.01) |
| *G06F 3/0482* | (2013.01) |

(52) U.S. Cl.
CPC .......... *G06F 3/0488* (2013.01); *G06F 3/0414* (2013.01); *G06F 3/0482* (2013.01); *G06F 3/0484* (2013.01); *G06F 3/04847* (2013.01); *H04N 5/23216* (2013.01); *H04N 5/232933* (2018.08); *G06F 2203/04108* (2013.01)

(58) Field of Classification Search
CPC .. G06F 3/0488; G06F 3/0414; G06F 3/04847; H04N 5/232933
See application file for complete search history.

(56) References Cited

U.S. PATENT DOCUMENTS

| | | | |
|---|---|---|---|
| 2009/0153288 A1* | 6/2009 | Hope | G06F 3/0482 340/3.1 |
| 2011/0249165 A1 | 10/2011 | Churei | |
| 2012/0249435 A1* | 10/2012 | Nahm | G06F 3/0485 345/173 |
| 2014/0267114 A1 | 9/2014 | Lisseman | |
| 2016/0018984 A1* | 1/2016 | Choi | G06F 21/629 715/716 |
| 2016/0266775 A1* | 9/2016 | Shin | G01C 21/367 |

FOREIGN PATENT DOCUMENTS

JP 03-288221 A 12/1991

* cited by examiner

*Primary Examiner* — Abbas I Abdulselam
(74) *Attorney, Agent, or Firm* — Canon U.S.A., Inc. IP Division

(57) ABSTRACT

An electronic apparatus includes touch and pressure detection units and a control unit. The touch detection unit detects a touch on a touch surface. The pressure detection unit detects a pressure on the touch surface. In response to movement of a touch position in a first direction with the touch kept detected, the control unit changes a setting value of a specific setting item in a predetermined direction. In response to movement of the touch position in a second direction with the touch kept detected, the control unit changes the setting value in another direction different from the predetermined direction. In response to detection of the pressure by the touch after changing the setting value of the specific setting item upon movement of the touch position in the first direction, the control unit further changes the setting value of the specific setting item in the predetermined direction.

26 Claims, 15 Drawing Sheets

FIG.3

| No. | ISO VALUE | |
|---|---|---|
| 0 | AUTO | |
| 1 | 100 | ○ |
| 2 | 125 | |
| 3 | 160 | |
| 4 | 200 | ○ |
| 5 | 250 | |
| 5 | 320 | |
| 7 | 400 | ○ |
| 8 | 500 | |
| 9 | 640 | |
| 10 | 800 | ○ |
| 11 | 1000 | |
| 12 | 1250 | |
| 13 | 1600 | ○ |
| 14 | 2000 | |
| 15 | 2500 | |
| 16 | 3200 | ○ |
| 17 | 4000 | |
| 18 | 5000 | |
| 19 | 6400 | ○ |
| 20 | 8000 | |
| 21 | 10000 | |
| 22 | 12800 | ○ |
| 25 | 16000 | |
| 24 | H1(25600) | ○ |
| 25 | H2(51200) | ○ |

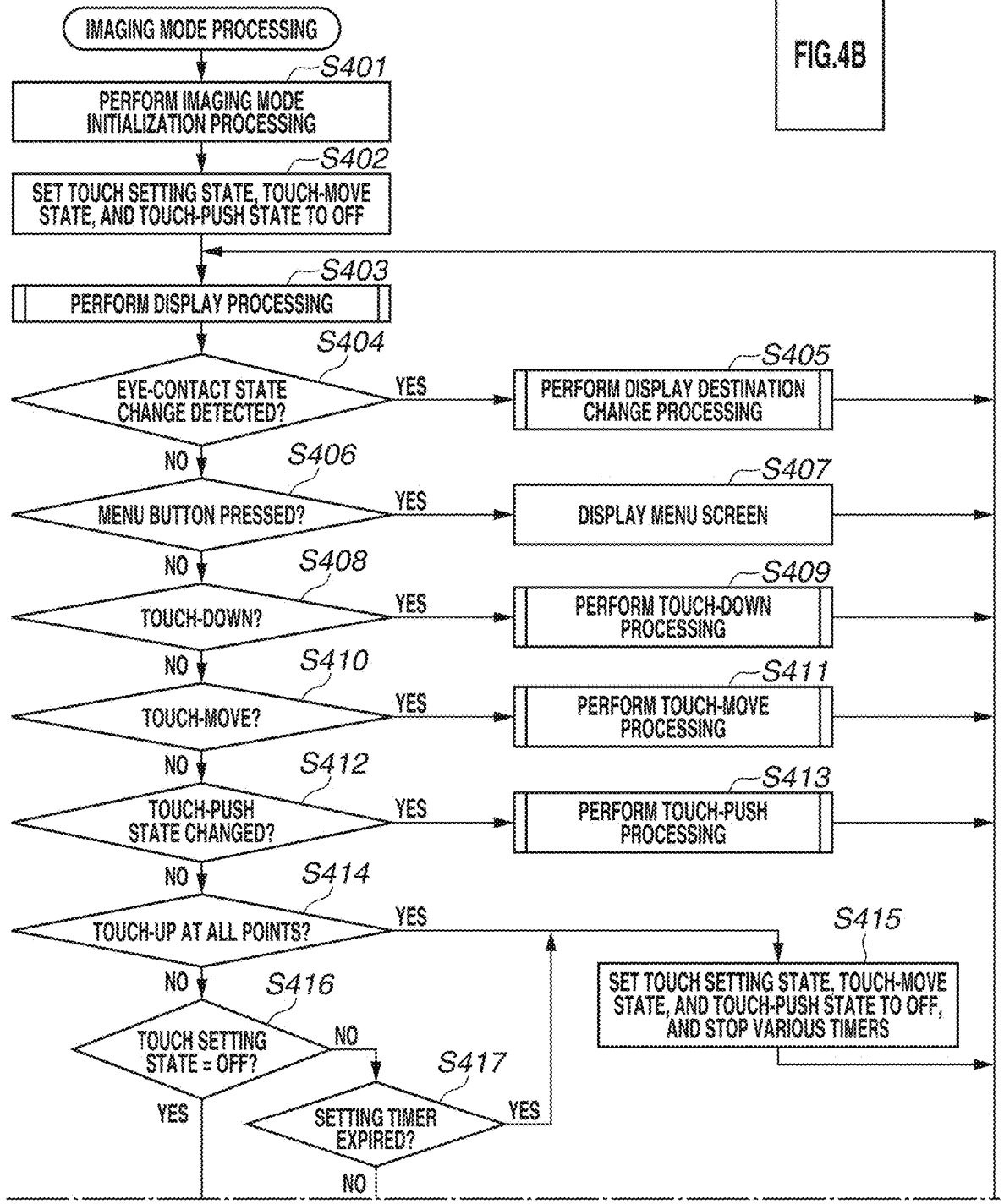

FIG.8A

IMAGING SETTINGS

| | |
|---|---|
| BLIND TOUCH OPERATION SETTINGS | |
| TOUCH OPERATION SETTINGS | |
| RECORDING IMAGE QUALITY | ◢L |
| ASPECT RATIO | 3:2 |
| DISPLAY CAPTURED IMAGE FOR CONFIRMATION | 2 SECONDS |
| GRID | NOT DISPLAYED |

BLIND TOUCH OPERATION SETTINGS

| | |
|---|---|
| BLIND TOUCH OPERATION | NOT PERFORMED |
| POSITION SPECIFICATION METHOD | RELATIVE POSITION |
| TOUCH AREA | ENTIRE SCREEN |
| IMAGING SETTINGS | ISO |

BLIND TOUCH OPERATION SETTINGS

| | |
|---|---|
| BLIND TOUCH OPERATION | NOT PERFORMED |
| | IMAGING SETTINGS |
| | AF POSITION SPECIFICATION |

BLIND TOUCH OPERATION SETTINGS

| | |
|---|---|
| POSITION SPECIFICATION METHOD | ABSOLUTE POSITION |
| | RELATIVE POSITION |

810

ELECTRONIC APPARATUS AND METHOD FOR CONTROLLING THE SAME

BACKGROUND OF THE INVENTION

Field of the Invention

The present disclosure relates to an electronic apparatus suitably used for changing setting values through touch operations, and a method for controlling the electronic apparatus.

Description of the Related Art

In recent years, increasing number of electronic apparatuses mount a touch panel. Such an electronic apparatus makes it easier to change settings through touch operations while confirming a display screen. A technique is known to quickly change settings by continuously changing setting values through touch operations.

Japanese Patent Application Laid-Open No. 3-288221 discusses a technique for performing control to change the interval between continuous setting operations by changing the pressure on a touch panel.

The conventional technique discussed in Japanese Patent Application Laid-Open No. 3-288221 performs continuous setting operations including largely changing and fine-tuning a setting value. However, it is necessary to separately issue an instruction for increasing or decreasing the setting value (an instruction of increasing direction or decreasing direction).

SUMMARY OF THE INVENTION

The present disclosure is directed to making it possible to more quickly set a setting value as a user intends both when largely changing the setting value and when fine-tuning the setting value in a desired change direction.

According to an aspect of the present invention, an electronic apparatus includes a touch detection unit configured to detect a touch on a touch surface, a pressure detection unit configured to detect a pressure on the touch surface, and a memory and at least one processor configured to function as: a control unit configured to perform control, wherein, in response to movement of a touch position in a first direction with the touch kept being detected by the touch detection unit, the control unit performs control to change a setting value of a specific setting item in a predetermined direction, wherein, in response to movement of the touch position in a second direction with the touch kept being detected by the touch detection unit, the control unit performs control to change the setting value of the specific setting item in another direction different from the predetermined direction, and wherein, in response to detection of the pressure by the touch after changing the setting value of the specific setting item upon movement of the touch position in the first direction, the control unit performs control to further change the setting value of the specific setting item in the predetermined direction.

Further features of the present invention will become apparent from the following description of embodiments with reference to the attached drawings.

BRIEF DESCRIPTION OF THE DRAWINGS

FIG. 3 is a diagram illustrating examples of International Organization for Standardization (ISO) sensitivity setting value candidates.

FIGS. 4A and 4B are flowcharts illustrating in detail an example of an imaging mode processing procedure.

FIGS. 8A to 8G are diagrams illustrating examples of menu screens.

DESCRIPTION OF THE EMBODIMENTS

An embodiment will be described in detail below with reference to the accompanying drawings.

It is to be noted that the following embodiment is merely one example for implementing the present disclosure and can be appropriately modified or changed depending on individual constructions and various conditions of apparatuses to which the present disclosure is applied. Thus, the present disclosure is in no way limited to the following embodiment.

An embodiment of the present disclosure will be described below with reference to the accompanying drawings. The embodiment will be described below centering on an example case where the electronic apparatus according to the present disclosure is applied to a digital camera capable of capturing a still image and a moving image. Imaging settings will be described below as examples of setting items which can be changed through touch operations.

Figure 1:
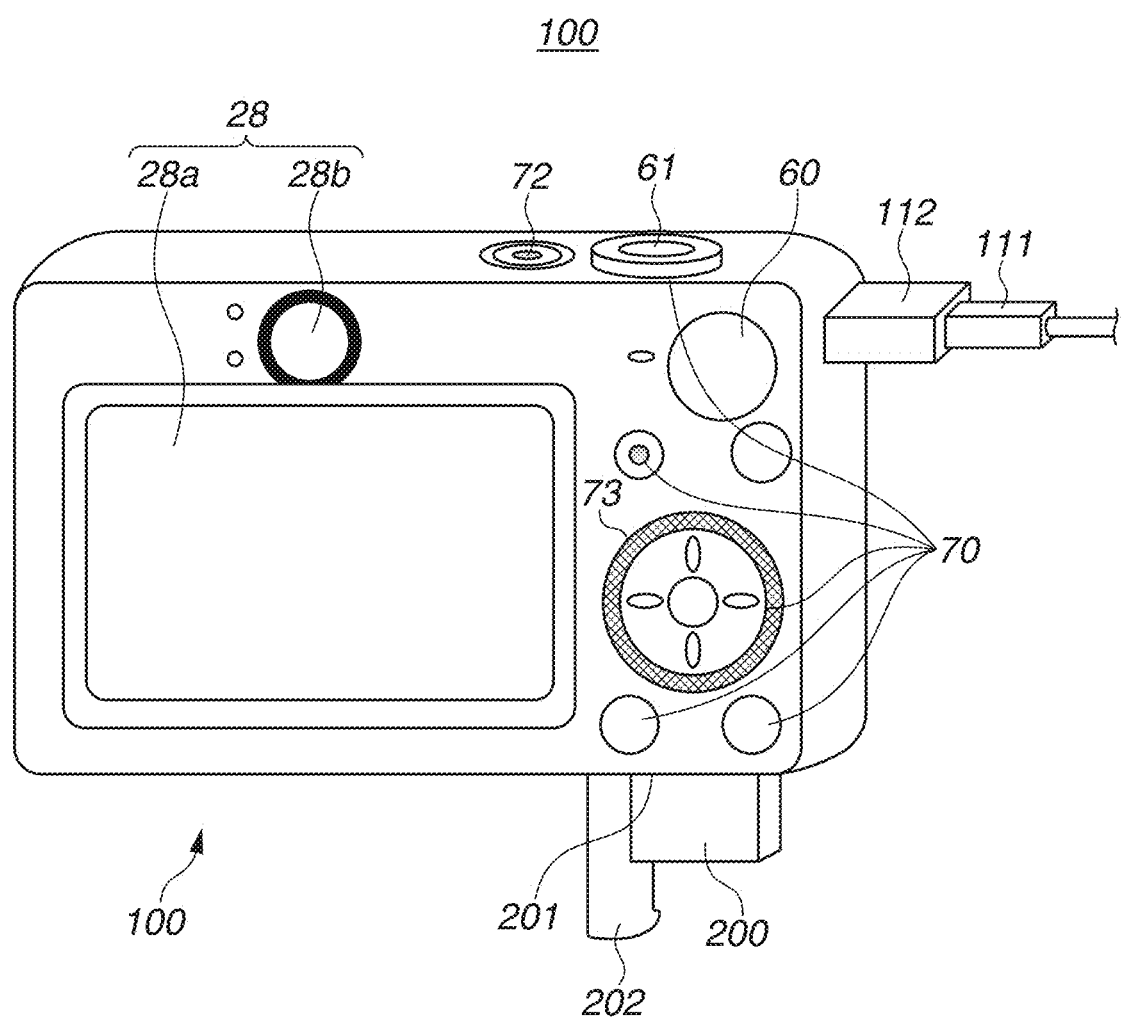
FIG. 1 is a diagram illustrating an example of an outer appearance of a digital camera according to an embodiment.

FIG. 1 illustrates an example of an outer appearance of a digital camera 100 as an example of an electronic apparatus according to the present embodiment.

Referring to FIG. 1, a display unit 28 displays an image and various information. The display unit 28 includes a back display panel 28a and an electronic view finder 28b as an in-finder display unit. A shutter button is an operation member for issuing an imaging instruction. A mode change switch 60 is an operation member for switching between various modes. A connector 112 connects between the digital camera 100 and a connecting cable 111 for connecting with an external apparatus, such as a personal computer and printer.

An operation unit 70 includes various switches, buttons, a touch panel, and other operation members for receiving various operations from a user. A controller wheel 73 is a rotatably operable operation member included in the operation unit 70. A power switch 72 is a push button for turning power ON and OFF. A recording medium 200 is a memory card or a hard disk. A recording medium slot 201 is used to store the recording medium 200. The recording medium 200 stored in the recording medium slot 201 allows communication with the digital camera 100 to allow data recording and reproduction. A lid 202 covers the recording medium slot 201. Referring to FIG. 1, the lid 202 is opened and a part of the recording medium 200 is taken out (exposed) from the recording medium slot 201.

Figure 2:
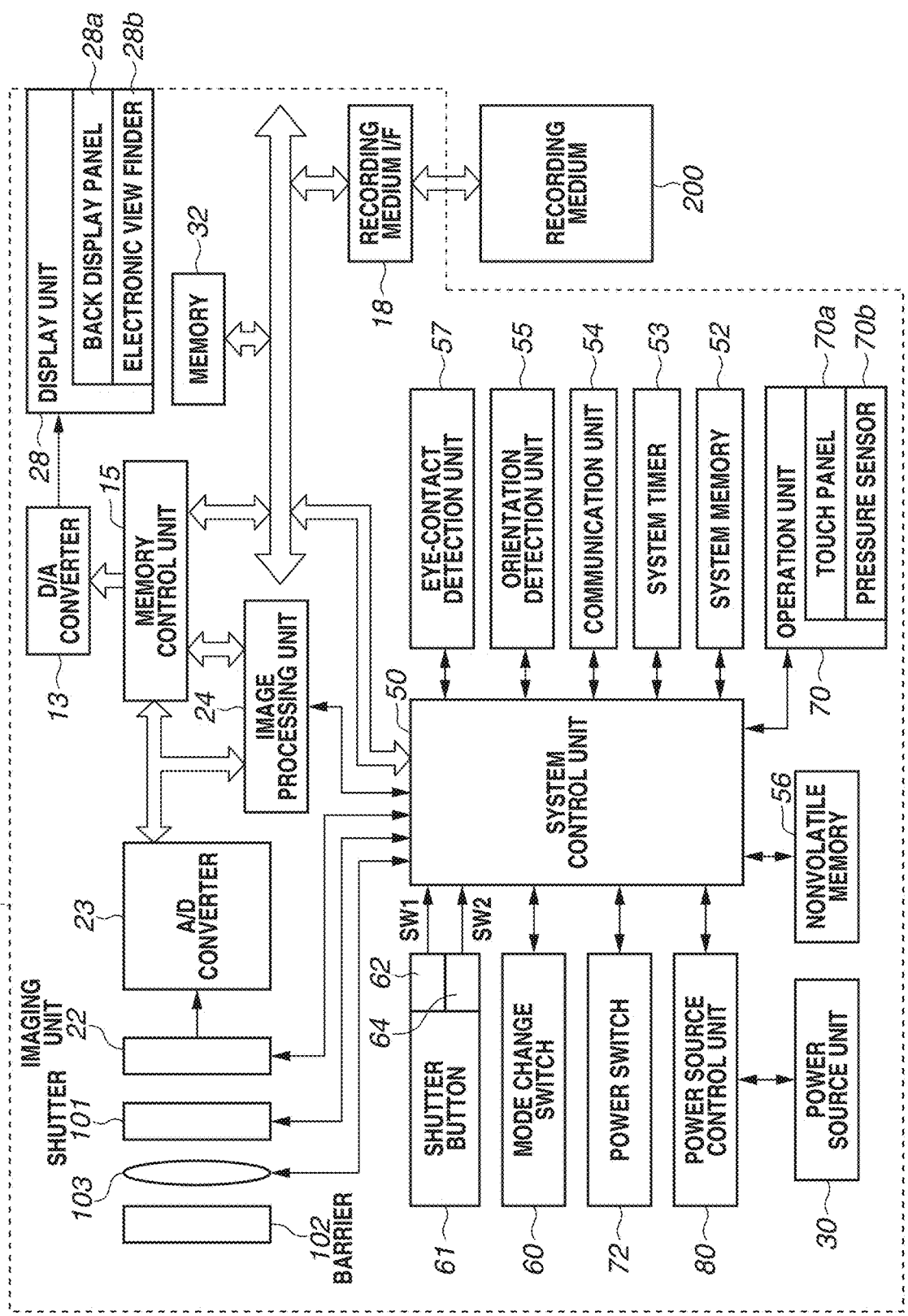
FIG. 2 is a block diagram illustrating an example of an internal configuration of the digital camera according to the embodiment.

FIG. 2 is a block diagram illustrating an example of an internal configuration of the digital camera 100 according to the present embodiment.

Referring to FIG. 2, an imaging lens 103 is a group of lenses including a zoom lens and a focusing lens. A shutter 101 is provided with a diaphragm function. An imaging unit 22 is an image sensor composed of a charge coupled device (CCD) sensor or complementary metal-oxide semiconductor (CMOS) sensor for converting an optical image into an electrical signal. An analog-to-digital (A/D) converter 23 converts an analog signal output from the imaging unit 22 into a digital signal. A barrier 102 covers the imaging system of the digital camera 100 including the imaging lens 103 to prevent the imaging system including the imaging lens 103, the shutter 101, and the imaging unit 22 from being stained and damaged.

An image processing unit 24 performs resizing processing (such as predetermined pixel interpolation and reduction) and color conversion processing on data from the A/D converter 23 or data from a memory control unit 15. The image processing unit 24 performs predetermined calculation processing by using captured image data. A system control unit 50 performs exposure control and ranging control based on an acquired calculation result. Thus, autofocus (AF) processing, automatic exposure (AE) processing, and pre-flashing (EF) processing are performed on a through-the-lens (TTL) basis. The image processing unit 24 further performs predetermined calculation processing by using captured image data and also performs TTL-based automatic white balance (AWB) processing based on an acquired calculation result.

The data output from the A/D converter 23 is directly stored in a memory 32 via the image processing unit 24 and the memory control unit 15, or via the memory control unit 15. The memory 32 stores image data acquired by the imaging unit 22 and then converted into digital data by the A/D converter 23, and image data to be displayed on the display unit 28. The memory 32 has a sufficient storage capacity for storing a predetermined number of still images and moving images and sound having predetermined time lengths.

The memory 32 also serves as a memory (video memory) for image display. A digital-to-analog (D/A) converter 13 converts image display data stored in the memory 32 into an analog signal and supplies the data to the display unit 28. In this way, the image display data stored in the memory 32 is displayed by the display unit 28 via the D/A converter 13. The display unit 28 performs display according to the analog signal from the D/A converter 13 on a display unit such as a liquid crystal display (LCD). The digital signal stored in the memory 32 as a result of the A/D conversion by the A/D converter 23 is converted into an analog signal by the D/A converter 13. This analog signal is successively transferred to the display unit 28, allowing the display unit 28 to perform live view display.

A nonvolatile memory 56 serves as an electrically erasable recordable recording medium and is, for example, an electrically erasable programmable read only memory (EEPROM). The nonvolatile memory 56 stores constants and programs for operations of the system control unit 50. Programs refer to computer programs for executing various flowcharts (described below) according to the present embodiment.

The system control unit 50 is at least one processor or circuit which controls the entire digital camera 100. The system control unit 50 implements each piece of processing according to the present embodiment (described below) by executing a program stored in the above-described nonvolatile memory 56. A random access memory (RAM) is used as the system memory 52. The system control unit 50 loads into the system memory 52 constants and variables for operations of the system control unit 50 and a program read from the nonvolatile memory 56. The system control unit 50 also performs display control by controlling the memory 32, the D/A converter 13, and the display unit 28. A system timer 53 is as clocking unit for measuring time used for various control and time of a built-in clock.

The mode change switch 60, the shutter button 61, and the operation unit 70 are used to input various operation instructions to the system control unit 50.

The mode change switch 60 switches the operation mode of the system control unit 50 between the still image recording mode, the moving image capturing mode, and the reproduction mode. The still image recording mode includes an auto imaging mode, auto scene determination mode, manual mode, various scene modes as imaging settings for each imaging scene, programmed AE mode, and custom mode. The mode change switch 60 allows the user to directly select one of these modes included in a menu button. Alternatively, after once selecting the menu button by using the mode change switch 60, the user may select one of these modes included in the menu button by using other operation members. Similarly, the moving image capturing mode may include a plurality of modes.

In the middle of an operation of the shutter button 61 provided on the digital camera 100, what is called a half press (imaging preparation instruction), a first shutter switch 62 turns ON to generate a first shutter switch signal SW1. Upon issuance of the first shutter switch signal SW1, the system control unit 50 starts operations of AF processing, AE processing, AWB processing, and EF processing.

Upon completion of an operation of the shutter button 61, what is called a full press (imaging instruction), a second shutter switch 64 turns ON to generate a second shutter switch signal SW2. Upon issuance of the second shutter switch signal SW2, the system control unit 50 starts a series of operations for imaging processing ranging from signal reading from the imaging unit 22 to image data writing in the recording medium 200.

When the user performs an operation for selecting one of various function icons displayed on the display unit 28, the operation unit 70 is suitably assigned functions for each scene and functions as various function buttons. Function buttons include an end button, return button, image feeding button, jump button, narrowing-down button, and attribute change button. For example, when the user presses the menu button, a menu screen for allowing various setting operations is displayed on the display unit 28. The user can intuitively perform various setting operations by using the menu screen displayed on the display unit 28, a four-direction button, and a SET button. For example, each time the user presses a live view button, a video acquired via the imaging unit 22 is displayed on the display unit 28 or undisplayed.

The controller wheel 73 illustrated in FIG. 1 is a rotatably operable operation member included in the operation unit 70 and is used together with the four-direction button, for example, when specifying a selection item. When the user performs a rotary operation of the controller wheel 73, an electrical pulse signal is generated according to the operation amount, and the system control unit 50 controls each unit of the digital camera 100 based on this pulse signal. This pulse signal allows determining the angle and the number of rotations of the rotary operation performed on the controller wheel 73. The controller wheel 73 may be any kind of operation member as long as the member is able to detect a rotary operation. For example, the controller wheel 73 may be a dial operation member. In this case, the controller wheel 73 itself rotates in response to a rotary operation of the user to generate a pulse signal. The controller wheel 73 may also be an operation member composed of a touch sensor. In this case, the controller wheel 73 itself does not rotate but detect a rotary motion of the user's finger on the controller wheel 73 (what is called a touch wheel).

A power source control unit 80 includes a battery detection circuit, a direct current-direct current (DC-DC) converter, and a switch circuit for selecting a block to be supplied with power. The power source control unit 80 detects the presence or absence of a battery, a battery type, and a remaining battery capacity. The power source control unit 80 controls the DC-DC converter, based on the detection result and an instruction of the system control unit 50, to supply a required voltage to each unit including the recording medium 200 for a required time duration.

A power source unit 30 includes a primary battery (such as an alkaline battery and lithium battery), a secondary battery (such as a NiCd battery, NiMH battery, and Li battery), and an alternating current (AC) adaptor. A recording medium interface (I/F) 18 interfaces with the recording medium 200 such as a memory card and hard disk. The recording medium 200 is, for example, a memory card for recording captured images, and includes a semiconductor memory, optical disc, and magnetic disk.

A communication unit 54 wirelessly or wiredly establishes connection to perform transmission and reception of video signals and audio signals. The communication unit 54 is also able to access a wireless local area network (LAN) and the Internet. The communication unit 54 is able to transmit an image (including the live view image) captured by the imaging unit 22 and an image stored in the recording medium 200, and receive image data and other various information from an external apparatus.

An orientation detection unit 55 detects the orientation of the digital camera 100 in the gravity direction. Based on the orientation detected by the orientation detection unit 55, the system control unit 50 is able to determine whether the image captured by the imaging unit 22 is an image captured with the digital camera 100 horizontally held or an image captured with the digital camera 100 vertically held. The system control unit 50 is able to add orientation information according to the orientation detected by the orientation detection unit 55 to the image file of the image captured by the imaging unit 22, and to rotate the image before recording. An accelerometer and gyroscope sensor can be used as the orientation detection unit 55.

An eye-contact detection unit 57 detects the approach of the eye (object) to the finder. The system control unit 50 switches display/nondisplay between the back display panel 28a and the electronic view finder 28b depending on the state detected by the eye-contact detection unit 57.

A pressure sensor 70b detects the pressure onto the operation surface of the display unit 28. The pressure sensor 70b is able to continuously detect the intensity of the pressing force when the display unit 28 is pressed by a touch operation thereon. The pressure sensor 70b may be configured as a distortion gauge sensor installed at a portion distorted by the pressing force on the operation surface of the display unit 28. The pressing force on the operation surface of the display unit 28 may be detected based on the output value from the distortion gauge sensor. Alternatively, the pressure sensor 70b may be configured as a capacitance sensor installed in parallel with the display unit 28. The distance between the finger on the operation surface of the display unit 28 and the capacitance sensor may be calculated based on the capacitance value when the operation surface is distorted by the pressing force applied thereto. Then, the system control unit 50 may calculate the pressure based on the distance or equally handle the distance and pressure. The pressure sensor 70b may be of other types as long as it is able to detect the pressing force on the operation surface of the display unit 28. Further, the pressure sensor 70b and the display unit may be integrally formed. Hereinafter, a pressing operation on the operation surface of the display unit 28 is referred to as a touch-push.

A touch panel 70a that can detect a contact on the touch surface of the display unit 28 is provided as a member of the operation unit 70. The touch panel 70a and the display unit 28 can be integrally formed. For example, the touch panel 70a is configured so that the transmissivity of light may not disturb the display on the display unit 28, and is attached to the upper layer of the display surface of the display unit 28. Then, the input coordinates of the touch panel 70a are associated with the display coordinates of the display unit 28. This allows configuring such a graphical user interface (GUI) that virtually allows the user to directly operate the screen displayed on the display unit 28. The system control unit 50 is able to detect the following touch operations on the touch panel 70a and the following states thereof.

An operation to touch the touch panel 70a with a finger or pen that has not been in contact with the touch panel 70a, i.e., an operation to start touching (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen from the touch panel 70a, i.e., an operation to end touching (hereinafter referred to as a "touch-up")

A state where the finger or pen is not in contact with the touch panel 70a (hereinafter referred to as a "touch-off")

When a touch-down is detected, a touch-on is also detected at the same time. After a touch-down, a touch-on is normally kept being detected until a touch-up is detected. A touch-move is detected in a state where a touch-on is detected. Even if a touch-on is detected, a touch-move is not detected if the touch position remains unchanged. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of operation has been performed on the touch panel 70a. As for a touch-move, the moving direction of the finger or pen moving on the touch panel 70a can be determined for each of the vertical and horizontal components on the touch panel 70a based on changes of the position coordinates.

When a touch-down, a certain amount of a touch-move, and then a touch-up are performed on the touch panel 70a, a stroke is drawn. An operation to quickly draw a stroke is referred to as a flick. A flick is an operation to quickly move the finger over a certain distance while in contact with the touch panel 70a and then release the finger therefrom. In other words, a flick is an operation to quickly flip the surface of the touch panel 70a with the finger. When a touch-move at a predetermined speed or higher over a predetermined distance or longer is detected and then a touch-up is subsequently detected, a flick is determined. When a touch-move at a speed lower than a predetermined speed over a predetermined distance or longer is detected, a drag is determined. A touch operation to simultaneously touch a plurality of positions (for example, two positions) and then bring these positions close to each other is referred to as a "pinch-in". A touch operation to move these touch positions away from each other is referred to as a "pinch-out". A pinch-out and a pinch-in are collectively referred to as a pinch operation (or referred to as a "pinch"). The touch panel 70a may be of any one of various types including the resistance film type, capacitance type, surface acoustic wave type, infrared type, electromagnetic induction type, image recognition type, and optical sensor type. Although a touch is detected when the finger or pen comes in contact with the touch panel 70a or when the finger or pen comes close to the touch panel 70a depending on the type thereof, either type is applicable.

The following describes an operation performed on the touch panel 70a of the digital camera 100 by the user to change a setting value while viewing the electronic view finder 28b with an eye in contact with the finder. According to the present embodiment, setting values can be changed even in the eye-contact detection state, i.e., even with a blind operation in which the user is not viewing the touch panel 70a (touch operation in the eye-contact state). In this case, a setting value is incremented or decremented by 1 when the user touches the touch panel 70a and performs a touch-move. For example, a setting value is incremented by 1 in response to an upward touch-move over a predetermined distance (for example, about 1 cm) on the touch panel 70a. On the contrary, a setting value is decremented by 1 in response to a downward touch-move on the touch panel 70a. Once a setting value is changed in response to a touch-move, the setting value will be left unchanged even if a touch-move is subsequently performed as long as a touch-on is maintained. When a touch-move is detected as a result of a touch-up and another touch-down, a setting value is changed according to the direction of the touch-move. More specifically, when the user wants to increment a setting value by 5 in the eye-contact state, the user needs to repeat five times an operation including a touch-down on the touch panel 70a with the thumb of the right hand holding the digital camera 100, an upward touch-move over the predetermined distance or longer, and a touch-off. Thus, if the distance of the touch-move is the predetermined distance or longer, the setting value is changed by 1 in each touch-move regardless of whether the distance is longer or shorter than the predetermined distance. Therefore, even without being strictly conscious of the touch-move distance, the user can reliably fine-tune a setting value as the user intends through a rough operation.

On the other hand, when the user wants to largely change a setting value with the above-described touch-move operation, the user needs to repetitively perform the above-described operation a required number of times. According to the present embodiment, therefore, when a touch-move is performed and a touch-push (touch-push with a threshold pressure value or larger) is detected before detaching the finger or pen, the setting value is changed in the direction of the last touch-move. For example, when an upward touch-move over the predetermined distance or longer is detected, the setting value is incremented by 1. Subsequently, when a touch-push is once detected without a touch release, the setting value is further incremented by 1. When a touch-push is detected 3 more times, the setting value is further incremented by 3. With this operation, the user can increment the setting values during a single touch operation (i.e., in a time duration from a touch-down to a touch-up). This method allows reducing the number of times of up and down motions of the touching finger compared with changing a setting value by performing a touch-move 5 times as described above. On the contrary, when a downward touch-move over the predetermined distance or longer is detected, the setting value is decremented by 1. Subsequently, when a touch-push is detected once without a touch release, the setting value is further decremented by 1. When a touch-push is detected 3 more times, the setting value is further decremented by 3.

According to the present embodiment, therefore, when a touch-move is performed and a touch-push (touch-push with a pressure equal to or higher than the threshold value) is detected before detaching the finger or pen, the setting value is changed in the direction changed by the last touch-move. Although the key repeat state is generally entered after an operation over a predetermined time duration (for example, 1 second) is performed, the key repeat state is immediately entered when a touch-push is performed. Then, if a touch-push is continued (if a pressure equal to or higher than the threshold value is kept being detected), the setting value is changed in the direction changed by the last touch-move in a periodical way (for example, at 0.3-second intervals) according to the passage of continued time. For example, when an upward touch-move over the predetermined distance or longer is detected, the setting value is incremented by 1. Subsequently, when a touch-push is detected once without a touch release, the setting value is further incremented by 1. When the user holds the touch-push state for 0.9 seconds, the setting value is further incremented by 3. With this operation, the user can increment the setting values by 5 during a single touch operation (i.e., in a time duration from a touch-down to a touch-up). This method allows reducing the number of times of up and down motions of the touching finger compared with changing a setting value by performing a touch-move 5 times as described above. Further, the user needs to perform a touch-push only once, making it possible to largely change the setting value in a simple way with a small number of operations. On the contrary, when a downward touch-move over the predetermined distance or longer is detected, the setting value is decremented by 1. Subsequently, when a touch-push is detected once without a touch release, the setting value is further decremented by 1. When the user holds the touch-push state for 0.9 seconds, the setting value is further decremented by 3.

When a setting value is largely changed in this way, the setting value targeted by the user may not be reached or may be exceeded. In this case, repetitively performing a touch-move not accompanied by a touch-push several times allows strictly fine-tuning the setting value to a predetermined setting value by the user.

The following describes a processing procedure for providing the above-described operation method. According to the present embodiment, a processing procedure will be described below centering on the International Organization for Standardization (ISO) sensitivity as an example of a setting value to be changed. FIG. 3 illustrates all of ISO sensitivity setting value candidates which can be set to the digital camera 100. Referring to FIG. 3, AUTO or one of 26 different setting value candidates (Nos. 0 to 25) of the ISO sensitivity 100 to 51200 can be set to the digital camera 100. Setting value candidates of the ISO sensitivity 100 to 12800 can be set in ⅓-stop increments. Referring to FIG. 3, setting value candidates marked by circles are different ISO sensitivity setting value candidates in 1-exposure stop increments, and are setting value candidates numerically displayed on an ISO sensitivity setting bar 534 (described below). In the ISO sensitivity setting, "incrementing a setting value by 1" from the current setting value 200 (No. 4) means changing the current setting value to 250 (No. 5) which is the 1-step larger setting value candidate than the current setting value. In the ISO sensitivity setting, "incrementing a setting value by 5" from the current setting value 200 (No. 4) means changing the current setting value to 640 (No. 9) which is the 5-step larger setting value candidate than the current setting value.

Figure 4B:
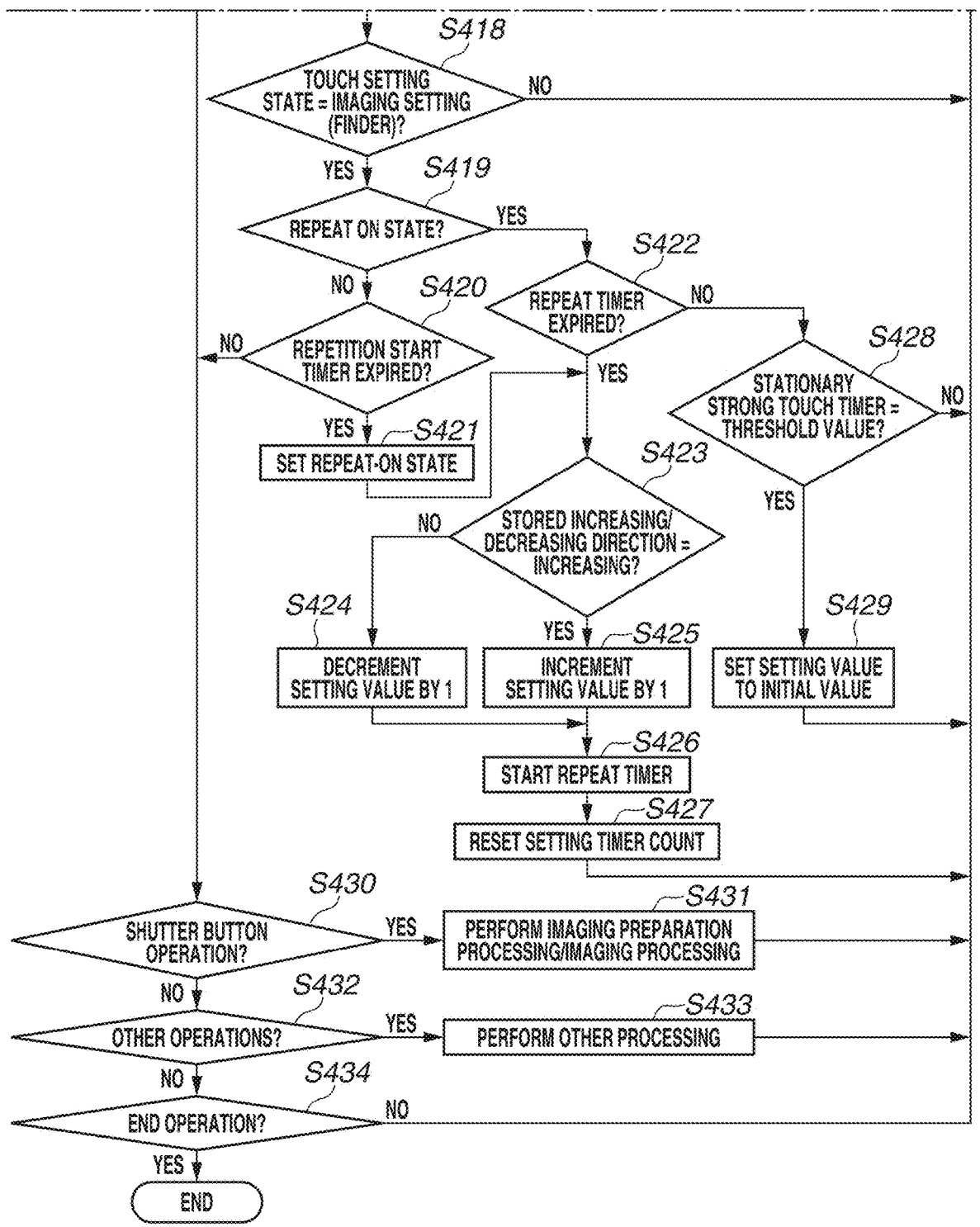

FIG. 4 is a flowchart illustrating an example of a detailed procedure in imaging mode processing by the digital camera 100. Processing illustrated in FIG. 4 is implemented when the system control unit 50 executes a program stored in the nonvolatile memory 56 by using the system memory 52 as a work memory. Similar to the flowchart illustrated in FIG. 4, various flowcharts to be described below (FIGS. 6, 7, 9, 10, and 11) are also implemented when the system control unit 50 executes a program stored in the nonvolatile memory 56 by using the system memory 52 as a work memory. When the digital camera 100 is activated in the imaging mode, processing illustrated in FIG. 4 will be started.

In step S401, the system control unit 50 performs imaging mode initialization processing. The initialization processing refers to processing for reading parameters (including flags and control variables), setting values, and setting modes from the nonvolatile memory 56. The system control unit 50 further confirms the state of the recording medium 200 and, if an abnormal condition is detected, displays a warning at the time of imaging information display (described below).

In step S402, the system control unit 50 sets the touch setting state (as a control variable), the touch-move state, and the touch-push state to OFF. The touch setting state as a control variable will be described below with reference to FIGS. 5A to 5D. The touch setting state has three different states: "OFF", "Imaging Setting (Back)", and "Imaging Setting (Finder)".

Figure 5A:
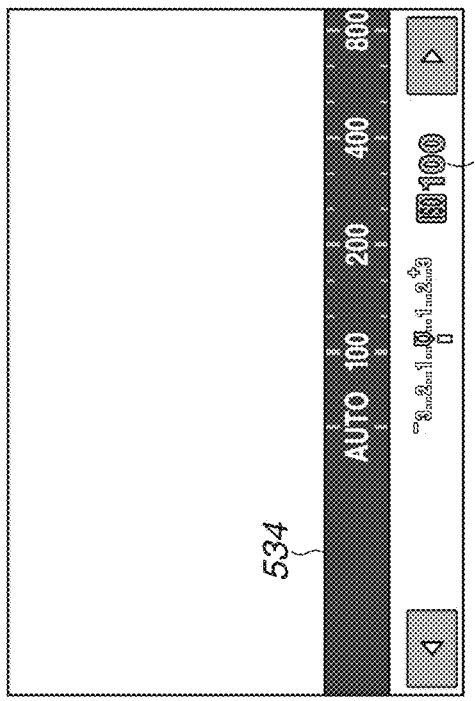
FIGS. 5A to 5D are diagrams illustrating examples of display screens in an imaging mode.

When the touch setting state is "OFF", the digital camera 100 enters the standby state where neither the operation for moving the AF frame nor the operation for changing the imaging setting is performed. In this state, the eye-contact detection is not performed by the eye-contact detection unit 57, and the back display panel 28a displays a screen as illustrated in FIG. 5A. Referring to an example illustrated in FIG. 5A, an imaging setting 512 and an AF frame 514 are displayed, and the areas where touch icons 516, 518, and 520 are displayed serve as touchable areas. The area of the touch icon 520 displays the current ISO sensitivity setting value as the imaging setting 512. When the user performs a touch-down on the touch icon 520, the digital camera 100 enters the "Imaging Setting (Back)" state (described below) allowing the user to change the imaging setting. On the screen illustrated in FIG. 5A, the user performs a touch-down on the touch icon 520 for ISO sensitivity setting, and thus an imaging setting UI for ISO sensitivity setting is displayed. When the touch setting state is "OFF" and the eye-contact detection is performed by the eye-contact detection unit 57, the electronic view finder 28b displays a screen illustrated in FIG. 5C. In an example illustrated in FIG. 5C, an AF frame 552 is displayed.

Figure 5B:
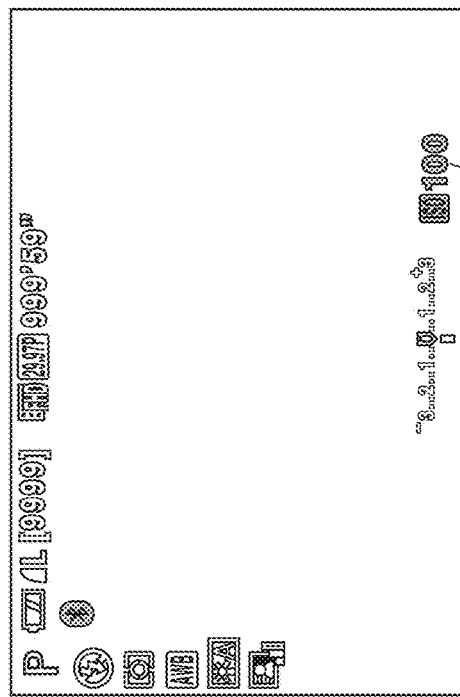

When the touch setting state is "Imaging Setting (Back)", the imaging setting state is limited to the display of the back display panel 28a as illustrated in FIG. 5B. In this case, the display mode in a state where the eye-contact detection is not performed by the eye-contact detection unit 57 results. In an example illustrated in FIG. 5B, the ISO sensitivity setting value is displayed as the imaging setting 532. The area where the ISO sensitivity setting bar 534 is displayed serves as a touchable area. The ISO sensitivity setting bar 534 as an imaging setting UI for ISO sensitivity setting displays as scales the settable setting value candidates described above with reference to FIG. 3. Setting value candidates in 1-stop increments marked by circles illustrated in FIG. 3 are also supplied with numerical values. When a touch-down is detected at the position of the scale corresponding to "200" on the ISO sensitivity setting bar 534, the ISO sensitivity as an imaging setting is set to 200.

Figure 5C:
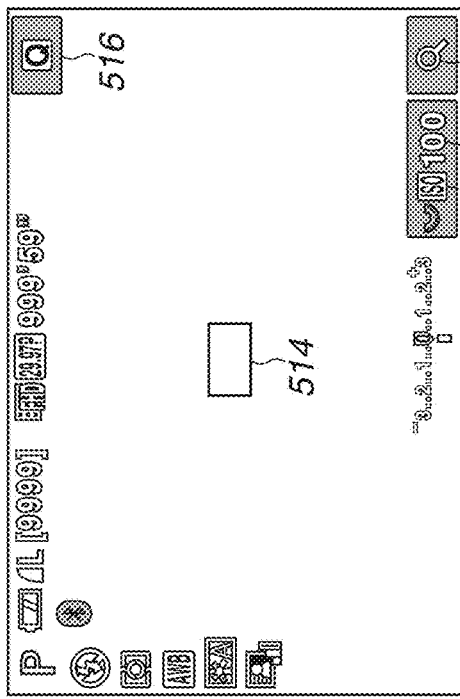
Figure 5D:
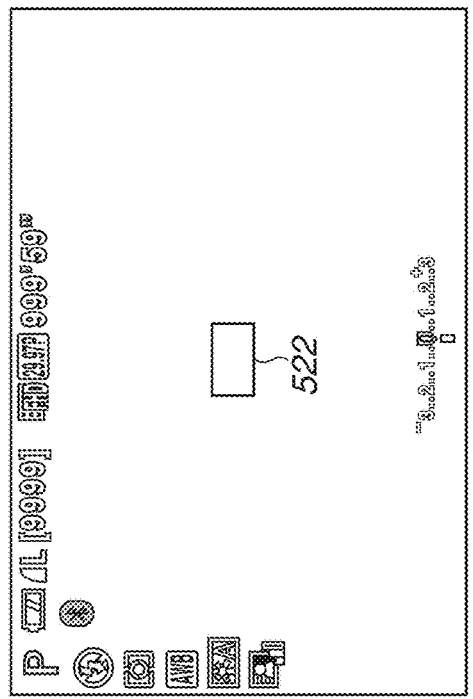

When the touch setting state is "Imaging Setting (Finder)", the imaging setting state is entered. In this state, the electronic view finder 28b displays a screen as illustrated in FIG. 5C in a state where the eye-contact detection is performed by the eye-contact detection unit 57. In this case, the user can change the imaging setting by operating the touch panel 70a while viewing the electronic view finder 28b. Referring to FIG. 5D, the current ISO sensitivity setting value is displayed as an imaging setting 542, and the imaging setting is changed by operating the touch panel 70a. Referring to FIGS. 5A to 5D, the background is illustrated in white but actually is a live view image (LV image).

The touch-move state as a control variable will be described below. The touch-move state includes two different states "ON" and "OFF". The touch-move state is set to "ON" in a state where the system control unit 50 detects a touch-move over the predetermined distance or longer for causing a setting value change on the touch panel 70a when the touch setting state is "Imaging Setting (Finder)". This state continues until a touch operation is no longer detected (until a touch-up is detected) on the touch panel 70a. The touch-move state is "OFF" when the touch-move state is not "ON".

A touch-push state as a control variable will be described below. The touch-push state includes three different states "Strong", "Weak", and "OFF". The touch-push state is set to "Strong" in a state where a touch operation is detected on the touch panel 70a and a touch-push operation, for which a pressure equal to or higher than a threshold value is detected by the pressure sensor 70b, is detected. The touch-push state is set to "Weak" in a state where a touch operation is detected on the touch panel 70a but a touch-push operation is not detected when the touch setting state is "Imaging Setting (Finder)". More specifically, this is a state where the pressure sensor 70b does not detect a pressure equal to or higher than the threshold value. While the user is merely touching the touch panel 70a without intentionally applying a pressure thereto, the touch-push state is set to "Weak". Even in this state, a weak pressure lower than a threshold value is generally being detected. The touch-push state is "OFF" in a state where the touch-push state is neither "Strong" nor "Weak". The touch-push state is "OFF" in a state where the user has not touched the touch panel 70a (touch-off). In this case, the pressure sensor 70b is not detecting the pressure of the finger. Hereinafter, a touch-push operation with the "Strong" touch-push state is referred to as a "touch-push operation".

By determining the above-described touch-move state and touch-push state, the system control unit 50 is able to switch between the operation for a touch-push operation without a touch-move and the operation for a touch-move operation without a touch-push. Although a state where the pressure sensor 70b detects a touch-push operation is described as one touch-push state, a plurality of touch-push states may be distinguished based on different magnitudes of the detected pressure. In an example where a plurality of pressure threshold values is set, when the pressure sensor 70b detects a pressure equal to or higher than a threshold value Pth1 and lower than a threshold value Pth2 (larger than Pth1), the system control unit 50 determines a first touch-push state (weak touch-push state). On the other hand, when the pressure sensor 70b detects a pressure equal to or higher than the threshold value Pth2, the system control unit 50 may determine a second touch-push state (strong touch-push state). This allows more finely dividing the touch-push state. The following embodiment may be applied on the premise that a touch-push corresponding to the second touch-push state is regarded as a "touch-push operation".

Referring to FIG. 4 again, in step S403, the system control unit 50 performs display processing. The display processing will be described below with reference to FIG. 6.

Figure 6:
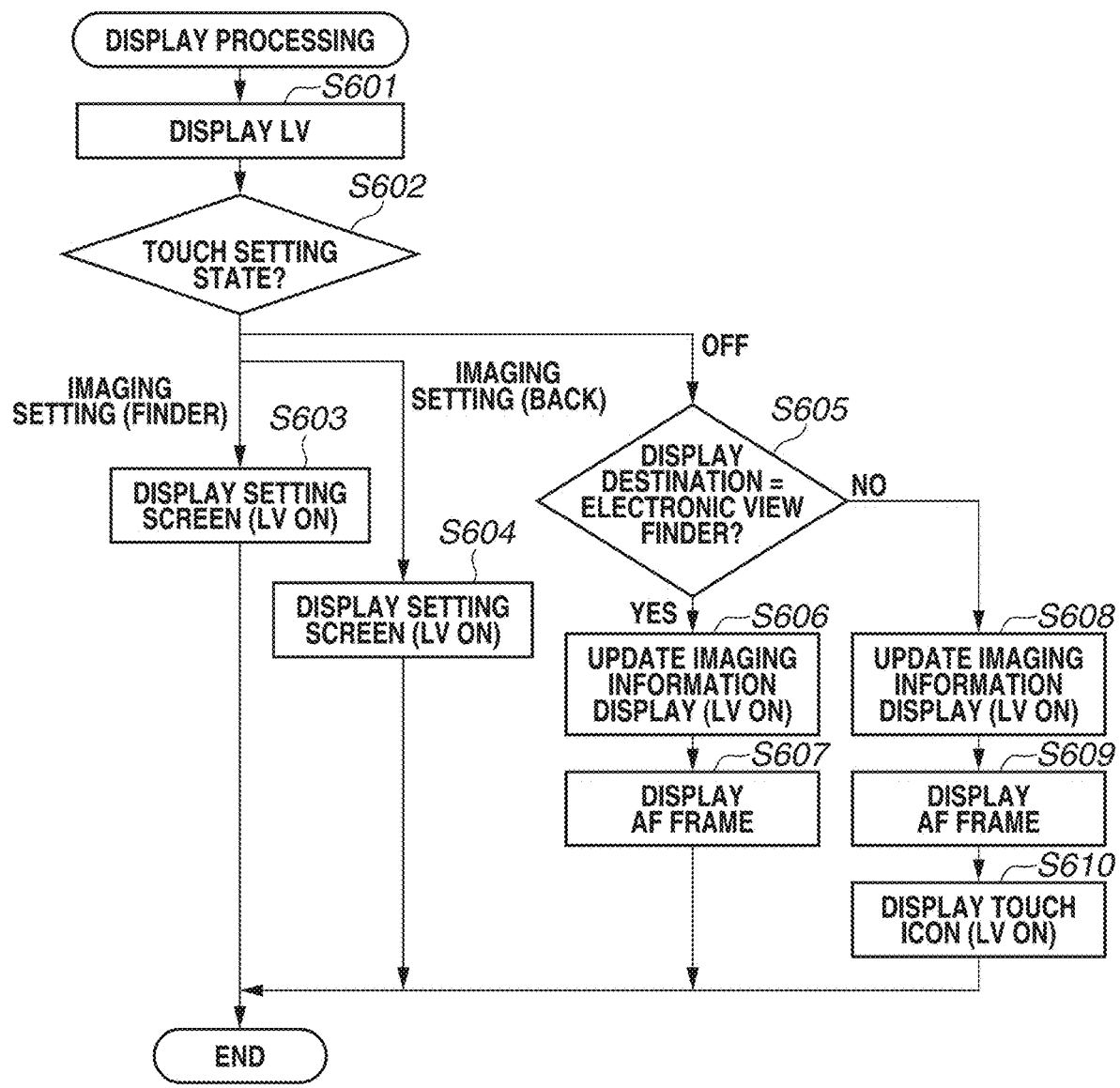
FIG. 6 is a flowchart illustrating in detail an example of a display processing procedure.

FIG. 6 is a flowchart illustrating in detail an example of the display processing procedure in step S403 illustrated in FIG. 4.

In step S601, the system control unit 50 displays a video captured by the imaging unit 22 on the display unit 28 as a live view image (LV image) (live view display).

In step S602, the system control unit 50 determines the touch setting state. When the touch setting state is "Imaging Setting (Finder)" (IMAGING SETTING (FINDER) in step S602), the processing proceeds to step S603. When the touch setting state is "Imaging Setting (Back)" (IMAGING SETTING (BACK) in step S602), the processing proceeds to step S604. When the touch setting state is "OFF" (OFF in step S602), the processing proceeds to step S605.

In step S603, the system control unit 50 displays a setting screen on the electronic view finder 28b. A screen as illustrated in FIG. 5D is displayed.

In step S604, the system control unit 50 displays a setting screen on the back display panel 28a. A screen as illustrated in FIG. 5B is displayed.

In step S605, the system control unit 50 determines whether the screen display destination is the electronic view finder 28b. When the display destination is the electronic view finder 28b (YES in step S605), the processing proceeds to step S606. On the other hand, when the display destination is the back display panel 28a (NO in step S605), the processing proceeds to step S608.

In step S606, the system control unit 50 updates the imaging information display on the electronic view finder 28b.

In step S607, the system control unit 50 displays an AF frame 522 on the electronic view finder 28b. A screen as illustrated in FIG. 5C is displayed. The imaging setting display is updated in step S606. The display of the AF frame 552 illustrated in FIG. 5C is updated in step S607.

In step S608, the system control unit 50 updates the imaging information display on the back display panel 28a.

In step S609, the system control unit 50 displays the AF frame 514 on the back display panel 28a.

In step S610, the system control unit 50 displays touch icons on the back display panel 28a.

A screen as illustrated in FIG. 5A is displayed, and the imaging setting display is updated in step S608. The display of the AF frame 514 illustrated in FIG. 5A is updated in step S609. The touch icons 516, 518, and 520 are displayed in step S610.

Referring to FIG. 4 again, in step S404, the system control unit 50 determines whether the state detected by the eye-contact detection unit 57 has changed. When the detection state has changed (YES in step S404), the processing proceeds to step S405. On the other hand, when the detection state remains unchanged (NO in step S404), the processing proceeds to step S406.

In step S405, the system control unit 50 performs display destination change processing. The display destination change processing will be described below with reference to FIG. 7.

Figure 7:
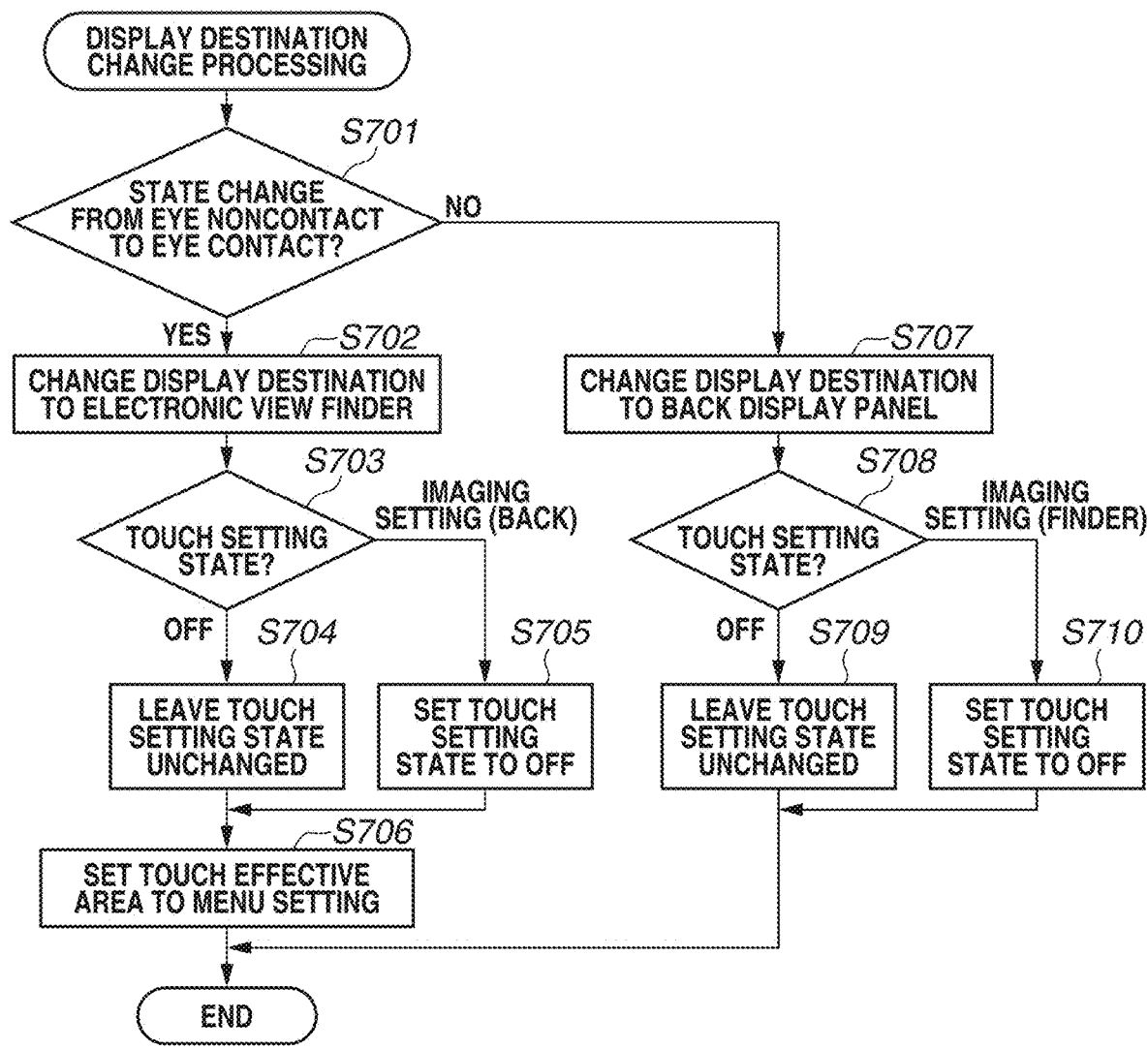
FIG. 7 is a flowchart illustrating in detail an example of a display destination change processing procedure.

FIG. 7 is a flowchart illustrating in detail an example of the display destination change processing procedure in step S405 illustrated in FIG. 4.

In step S701, the system control unit 50 determines whether the state change detected by the eye-contact detection unit 57 is a state change from the eye-noncontact state to the eye-contact state. When the detected state change is a change from the eye-noncontact state to the eye-contact state (YES in step S701), the processing proceeds to step S702. On the other hand, when the detected change is not a change from the eye-noncontact state to the eye-contact state (NO in step S701), the processing proceeds to step S707.

In step S702, the system control unit 50 changes the display destination to the electronic view finder 28b.

In step S703, the system control unit 50 determines the current touch setting state. When the touch setting state is "OFF" (OFF in step S703), the processing proceeds to step S704. On the other hand, when the touch setting state is "Imaging Setting (Back)" (IMAGING SETTING (BACK) in step S703), the processing proceeds to step S705.

In step S704, the system control unit 50 leaves the touch setting state unchanged. When the touch setting state is "OFF", the touch setting state remains unchanged even if the display destination is changed from the back display panel 28a to the electronic view finder 28b.

In step S705, the system control unit 50 sets the touch setting state to "OFF". In this way, when the touch setting state is "Imaging Setting (Back)", the system control unit 50 changes the touch setting state to "OFF" (i.e., standby state) when the display destination changes from the back display panel 28a to the electronic view finder 28b.

In step S706, the system control unit 50 sets the touch effective area to "Entire Screen", "Right Half", or "Left Half" according to the touch area set by the menu setting. The menu setting will be described in detail below.

In step S707, the system control unit 50 changes the display destination to the back display panel 28a.

In step S708, the system control unit 50 determines the touch setting state. When the touch setting state is "OFF" (OFF in step S708), the processing proceeds to step S709. On the other hand, when the touch setting state is "Imaging Setting (Finder)" (IMAGING SETTING (FINDER) in step S708), the processing proceeds to step S710.

In step S709, the system control unit 50 leaves the touch setting state unchanged. In this way, when the touch setting state is "OFF", the system control unit 50 leaves the touch setting state unchanged even if the display destination changes from the electronic view finder 28b to the back display panel 28a.

In step S710, the system control unit 50 sets the touch setting state to "OFF". In this way, when the touch setting state is "Imaging Setting (Finder)" and no imaging setting (finder) operation is performed, the display destination changes from the electronic view finder 28*b* to the back display panel 28*a*. In this case, the system control unit 50 sets the touch setting state to "OFF" (i.e., standby state).

In steps S704, S705, S709, and S710, when the display destination changes, the touch setting state is set to OFF in this way.

Referring to FIG. 4 again, in step S406, the system control unit 50 determines whether the menu button included in the operation unit 70 is pressed. When the menu button is pressed (YES in step S406), the processing proceeds to step S407. On the other hand, when the menu button is not pressed (NO in step S406), the processing proceeds to step S408.

In step S407, the system control unit 50 displays a menu screen (imaging setting menu screen) and changes imaging settings in response to user operations on the operation unit 70. According to the present embodiment, examples of setting screens will be described below for two different setting items, blind touch operation settings and touch operation settings.

FIG. 8A illustrates an example of an imaging setting menu screen displaying a setting item group 801 in list form. The user moves a cursor 802 by pressing the 4-direction button included in the operation unit 70, selects any desired setting item, and presses the SET button to display the setting change screen for the desired setting item.

FIG. 8B illustrates an example of a blind touch operation setting screen. Referring to an example illustrated in FIG. 8B, a setting item name 803 and sub items 804 to 807 are displayed. For the sub items 804 to 807, setting values 808 are displayed in list form.

The blind touch operation as the sub item 804 is used to set the operation to be performed when a touch operation is performed on the back liquid crystal display in the eye-contact detection state (when a touch operation is performed in the eye-contact state). FIG. 8C illustrates an example of a setting screen displayed when the user selects the sub item 804 and then presses the SET button. On the screen illustrated in FIG. 8C, the user selects a setting value from options 809. The user can select "Not Performed" as an initial value, "Imaging Setting", or "AF Position Specification". Each piece of processing described below is an example in a case where the blind touch operation is set to "Imaging Setting" with the sub item 804. When the blind touch operation is set to "Not Performed" as the sub item 804, the system control unit 50 does not change setting values even if a touch operation is detected in the eye-contact detection state, or does not perform touch detection in the eye-contact detection state. When the blind touch operation is set to "AF Position Specification" as the sub item 804, the system control unit 50 changes the AF position in response to a touch operation in the eye-contact detection state.

The position specification method as the sub item 805 is used to set a method for specifying the AF position by touching when the blind touch operation is set to "AF Position Specification" as the sub item 804, either to absolute coordinate method or relative coordinate method. FIG. 8D illustrates an example of a setting screen displayed when the user selects the sub item 805 and then presses the SET button. On the screen illustrated in FIG. 8D, the user selects a setting value from options 810, whether "Absolute Position," which is the initial value, or "Relative Position".

Figure 8E:
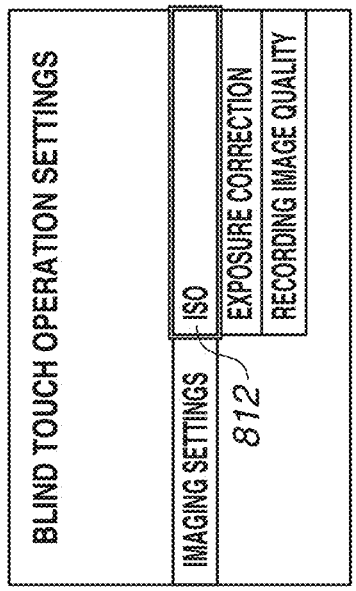

The touch area as the sub item 806 is used to set a touch effective area in the blind touch operation (touch operation in the eye-contact detection state). FIG. 8E illustrates an example of a setting screen displayed when the user selects the sub item 806 and then presses the SET button. As illustrated by options 811, the user can select "Right Half" for specifying the right half of the screen as a response area in addition to "Entire Screen" as the initial value, allowing the user to set a touch effective area according to the dominant eye and the peculiarity of orientation in the eye-contact state. For the blind touch operation (touch operation in the eye-contact state), since the user's nose may contact the back display panel 28*a* (touch panel 70*a*), it is necessary to prevent any imaging setting from being changed to an undesired value in response to the detection of nose contact. Therefore, a part of the area of the touch panel 70*a* which is unlikely to contact the nose is made settable as a touch effective area, and the area other than the touch effective area (an area which is highly likely to contact the nose) is set as a touch ineffective area where, even if a touch is detected, processing is not performed in response to the touch.

Figure 8F:
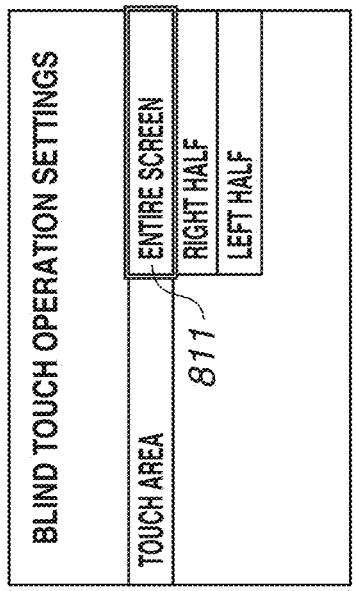

The imaging setting as the sub item 807 is used to set a setting item which is settable with a blind touch operation (touch operation in the eye-contact state) when the blind touch operation as the sub item 804 is set to "Imaging Setting". FIG. 8F illustrates an example of a setting screen displayed when the user selects the sub item 807 and then presses the SET button. On the screen illustrated in FIG. 8F, the user selects a setting value from options 812. In addition to "ISO" as the initial value, the user can be select "Exposure Setting" or "Recording Image Quality". The options 812 illustrated in FIG. 8F are examples and are not limited thereto, and other setting items may be made settable. When the sub item 807 is set to "ISO", the ISO sensitivity setting value described above with reference to FIG. 3 can be changed by a touch-move as a touch operation in the eye-contact state. When the sub item 807 is set to other than "ISO", the setting value of the setting item set as the sub items 807 other than ISO sensitivity is changed in response to a touch-move as a touch operation in the eye-contact state.

Figure 8G:
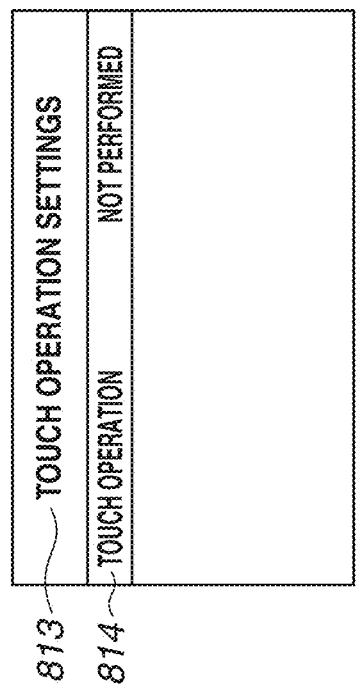

FIG. 8G illustrates an example of a setting screen displayed when the user selects "Touch Operation Settings" among the items displayed on the imaging setting menu screen illustrated in FIG. 8A and then presses the SET button. An item name 813 and a sub item 814 are displayed in this setting screen. The touch operation as the sub item 814 is used to set whether a touch operation on the touch panel 70*a* in the eye-contact non-detection state is effective or ineffective. In the screen illustrated in FIG. 8G, the user can select whether a touch operation is "Performed" (touch operation effective) or "Not Performed" (touch operation ineffective). Each piece of processing described below is an example of a case where a touch operation as the sub item 814 is set to "Performed". When a touch operation as the sub item 814 is set to "Not Performed", all of touch operations on the touch panel 70*a* in the eye-noncontact state become ineffective.

Referring to FIG. 4 again, in step S408, the system control unit 50 determines whether a touch-down on the touch panel 70*a* is detected. When a touch-down is detected (YES in step S408), the processing proceeds to step S409. On the other hand, when a touch-down is not detected (NO in step S408), the processing proceeds to step S410.

In step S409, the system control unit 50 performs touch-down processing. The touch-down processing will be described below with reference to FIG. 9.

Figure 9:
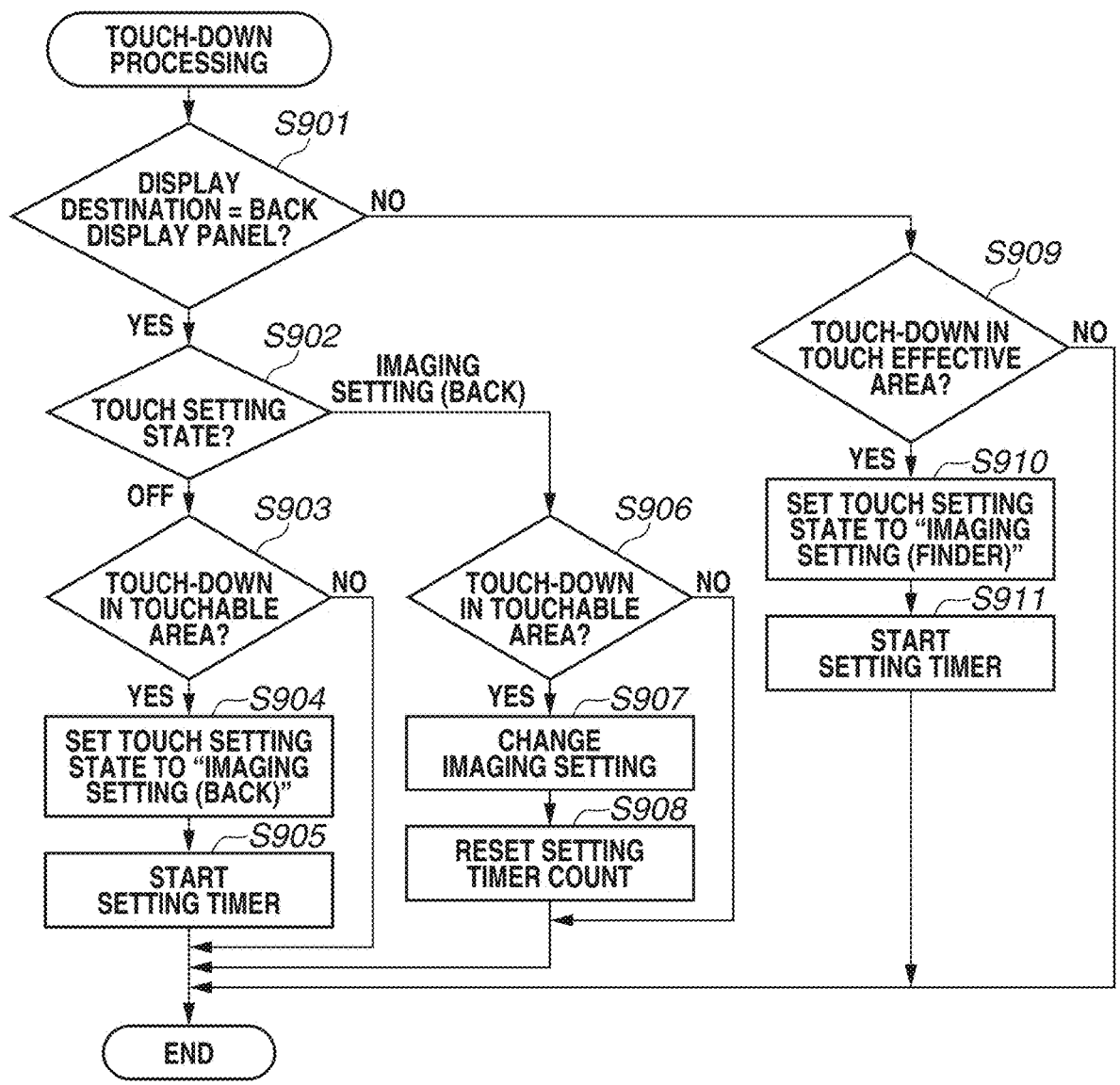
FIG. 9 is a flowchart illustrating in detail an example of a touch-down processing procedure.

FIG. 9 is a flowchart illustrating in detail an example of the touch-down processing procedure in step S409 illustrated in FIG. 4.

In step S901, the system control unit 50 determines whether the current display destination is the back display panel 28a. When the display destination is the back display panel 28a (YES in step S901), the processing proceeds to step S902. On the other hand, when the display destination is not the back display panel 28a, i.e., when the display destination is the electronic view finder 28b (NO in step S901), the processing proceeds to step S909.

In step S902, the system control unit 50 determines the touch setting state. When the touch setting state is "OFF" (OFF in step S902), the processing proceeds to step S903. On the other hand, when the touch setting state is "Imaging Setting (Back)" (IMAGING SETTING (BACK) in step S902), the processing proceeds to step S906.

In step S903, the system control unit 50 determines whether a touch-down is detected in the touchable area on the touch panel 70a. For example, the system control unit 50 determines whether a touch-down is detected on any one of the touch icons 516, 518, and 520 illustrated in FIG. 5A. When a touch-down is detected in the touchable area on the touch panel 70a (YES in step S903), the processing proceeds to step S904. On the other hand, when a touch-down is not detected in the touchable area (NO in step S903), the system control unit 50 ends the touch-down processing.

In step S904, the system control unit 50 sets the touch setting state to "Imaging Setting (Back)". In this way, the imaging setting corresponding to the touch icon on which a touch-down was performed is made changeable.

In step S905, the system control unit 50 starts counting a setting timer via the system timer 53. The setting timer refers to a timer for determining whether a no-operation time duration has reached a predetermined time duration. When the system control unit 50 determines that the no-operation time duration has reached the predetermined time duration via the setting timer, the system control unit 50 automatically sets the touch setting state, the touch-move state, and the touch-push state to OFF through the processing in steps S417 and S415 (described below). The system control unit 50 further stops various timers which have been counted when the touch setting state was the imaging setting (back) or imaging setting (finder).

In step S906, the system control unit 50 determines whether a touch-down is detected in the touchable area on the touch panel 70a. For example, the system control unit 50 determines whether a touch-down is detected at any one numerical value on the ISO sensitivity setting bar 534 illustrated in FIG. 5B. When a touch-down is detected in the touchable area on the touch panel 70a (YES in step S906), the processing proceeds to step S907. On the other hand, when a touch-down is not detected in the touchable area (NO in step S906), the system control unit 50 ends the touch-down processing.

In step S907, the system control unit 50 changes the imaging setting to the setting value corresponding to the touch-down position on the touch panel 70a. For example, when a touch-down is detected at the position where the numerical value 400 is displayed on the ISO sensitivity setting bars 534 while the screen illustrated in FIG. 5B is displayed, the ISO sensitivity is set to 400.

In step S908, the system control unit 50 resets the count of the setting timer via the system timer 53 and then starts counting the setting timer.

In step S909, the system control unit 50 determines whether the detected touch-down is a touch-down in the touch effective area set as the above-described sub item 806 on the touch panel 70a. When the detected touch-down is a touch-down in the touch effective area (YES in step S909), the processing proceeds to step S910. On the other hand, when the detected touch-down is not a touch-down in the touch effective area (when the detected touch-down is a touch-down in the touch ineffective area) (NO in step S909), the system control unit 50 ends the touch-down processing.

In step S910, the system control unit 50 sets the touch setting state to the imaging setting (finder). This changes the display screen from the display state illustrated in FIG. 5C before the touch-down to the display state illustrated in FIG. 5D after the touch-down, and the current ISO sensitivity setting value is displayed as the imaging setting 542. At this timing, the ISO sensitivity setting value has not yet been changed. This allows the user to determine which setting item's setting values can be changed by subsequently performing a touch-move, and determine whether the current ISO sensitivity setting value is the desired setting value (more specifically, whether the setting value needs to be changed). When a setting value other than the ISO sensitivity is set as the sub item 807, the current setting value of the setting item set as the sub item 807 is displayed as the imaging setting 542 instead of the ISO sensitivity. For example, when exposure correction is set as the sub item 807, the current exposure correction value is displayed on the electronic view finder 28b as the imaging setting 542 by performing a touch-down in the eye-contact state.

In step S911, the system control unit 50 resets the count of the setting timer via the system timer 53 and then starts counting the setting timer.

Referring to FIG. 4 again, in step S410, the system control unit 50 determines whether a touch-move is detected on the touch panel 70a. When a touch-move is detected (YES in step S410), the processing proceeds to step S411. On the other hand, when a touch-move is not detected (NO in step S410), the processing proceeds to step S412.

In step S411, the system control unit 50 performs touch-move processing. The touch-move processing will be described with reference to FIG. 10.

Figure 10:
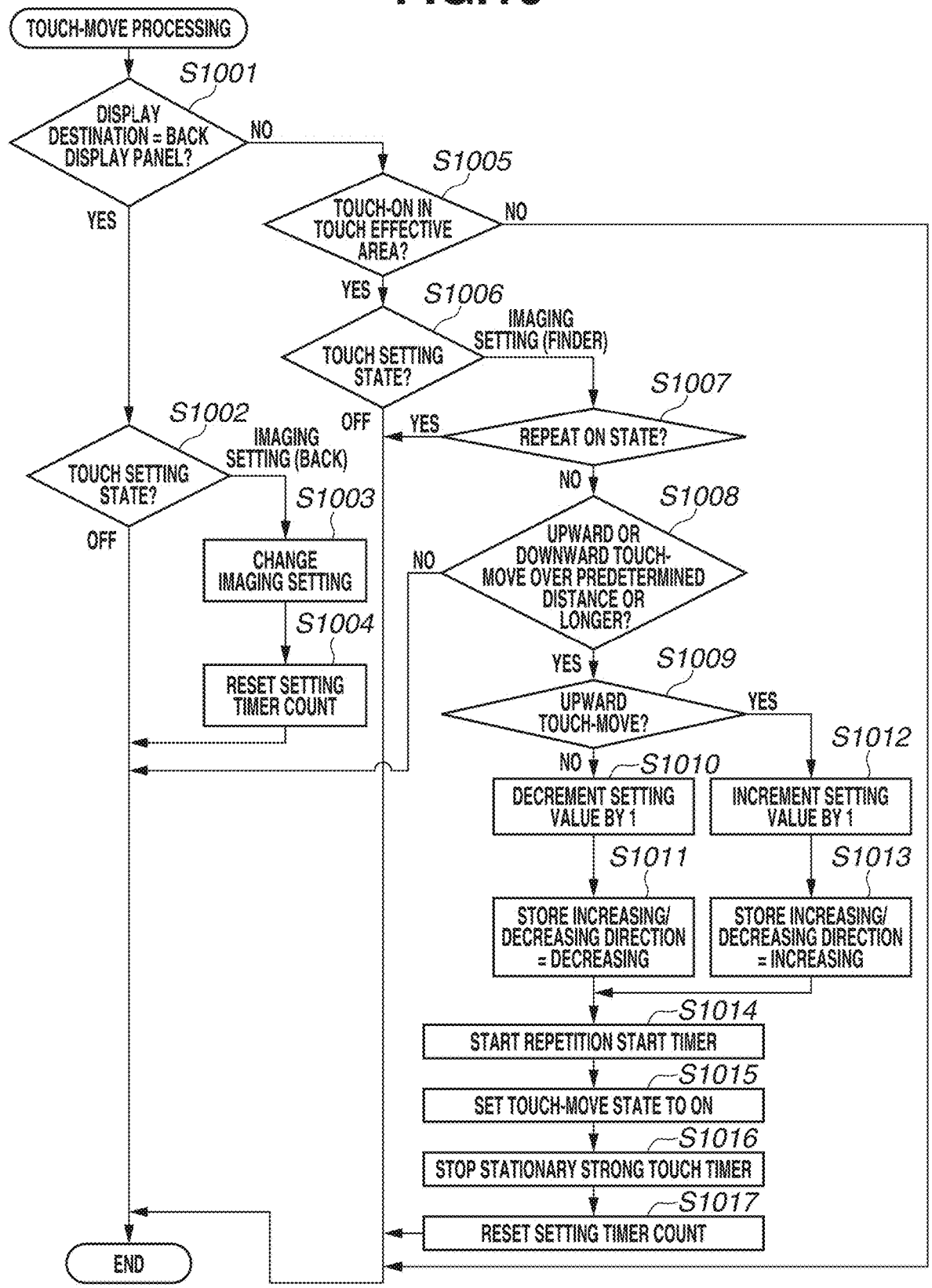
FIG. 10 is a flowchart illustrating in detail an example of a touch-move processing procedure.

FIG. 10 is a flowchart illustrating in detail an example of the touch-move processing procedure in step S411 illustrated in FIG. 4.

In step S1001, the system control unit 50 determines whether the current display destination is the back display panel 28a. When the current display destination is the back display panel 28a (YES in step S1001), the processing proceeds to step S1002. On the other hand, when the current display destination is not the back display panel 28a (i.e., when the display destination is the electronic view finder 28b) (NO in step S1001), the processing proceeds to step S1005.

In step S1002, the system control unit 50 determines the touch setting state. When the touch setting state is "OFF" (OFF in step S1002), the system control unit 50 ends the touch-move processing. On the other hand, when the touch setting state is "Imaging Setting (Back)" (IMAGING SETTING (BACK) in step S1002), the processing proceeds to step S1003.

In step S1003, the system control unit 50 changes the imaging setting by the value corresponding to the moving amount of a touch-move on the touch panel 70a.

In step S1004, the system control unit 50 resets the count of the setting timer via the system timer 53 and then starts counting the setting timer.

In step S1005, the system control unit 50 determines whether a touch-on is performed in the touch effective area set in the above-described menu screen illustrated in FIG. 8E. When a touch-on is detected in the touch effective area (YES in step S1005), the processing proceeds to step S1006. On the other hand, when a touch-on is not detected in the touch effective area (NO in step S1005), the system control unit 50 ends the touch-move processing.

In step S1006, the system control unit 50 determines the touch setting state. When the touch setting state is "OFF" (OFF in step S1006), the system control unit 50 ends the touch-move processing. On the other hand, when the touch setting state is "Imaging Setting (Finder)" (IMAGING SETTING (FINDER) in step S1006), the processing proceeds to step S1007. A case where the touch setting state is "OFF" (OFF in step S1006) although a touch-move is detected and then a touch-on is detected in the touch effective area is the following case: after the touch setting state is set to "Imaging Setting (Finder)" by a touch-down, the touch position is kept still until the setting timer expires and then a touch-move is performed. When the touch position is kept still until the setting timer expires, it is highly likely that the nose or the like has unintentionally been in contact with the touch position. In this case, upon expiration of the setting timer, the touch setting state is automatically set to OFF through the processing in steps S417 and S415 (described below). Therefore, even if the touch position moves and then a touch-move is detected, the system control unit 50 determines that the touch setting state is "OFF" in step S1006. Therefore, the touch-move processing is not performed. More specifically, even if a touch-on by the nose contact continues until the setting timer expires and then the nose unintentionally moves, malfunction by the nose contact can be prevented.

In step S1007, the system control unit 50 determines whether the repeat-ON state is currently set. The repeat-ON state refers to the above-described key repeat state where a setting value is periodically changed according to time passage when a continued operation is maintained. The system control unit 50 can determine whether the repeat-ON state is currently set by referring to a status flag stored in the system memory 52. Alternatively, the system control unit 50 can determine that the repeat-ON state is currently set when a repeat timer is being counted. When the repeat-ON state is currently set (YES in step S1007), the system control unit 50 ends the touch-move processing. More specifically, once the repeat-ON state is entered, even if a touch-move is performed, the system control unit 50 does not perform processing in response to the touch-move until a touch-up is made. On the other hand, when the repeat-ON state is not currently set (NO in step S1007), the processing proceeds to step S1008.

In step S1008, the system control unit 50 determines whether an upward or downward touch-move is performed over a predetermined distance or longer. The predetermined distance is, for example, 1 cm. More specifically, the system control unit 50 determines whether the difference in the Y-axis direction between the coordinates at which a touch-down is detected and the coordinates of the current touch position (vertical moving component) reaches the predetermined distance (1 cm) or longer, without taking into consideration the difference in the X-axis direction (horizontal moving component). If the difference in the X-axis direction exceeds a threshold value before the difference in the Y-axis direction reaches the predetermined distance, the system control unit 50 may recognize a touch-move in the horizontal direction and therefore select "NO" in step S1008 even if the difference in the Y-axis direction reaches the predetermined distance or longer. When the system control unit 50 determines that an upward or downward touch-move is performed over the predetermined distance or longer (YES in step S1008), the processing proceeds to step S1009. On the other hand, when an upward or downward touch-move is not performed over the predetermined distance or longer (NO in step S1008), the system control unit 50 ends the touch-move processing.

In step S1009, the system control unit 50 determines whether an upward touch-move is performed over the predetermined distance or longer. When an upward touch-move is performed (YES in step S1009), the processing proceeds to step S1012. On the other hand, when an upward touch-move is not performed (when a downward touch-move is performed) (NO in step S1009), the processing proceeds to step S1010.

In step S1010, the system control unit 50 decrements the setting value of the setting item set as the sub item 807 by 1. For example, when the ISO sensitivity is set to 200, the system control unit 50 changes the ISO sensitivity to 160.

In step S1011, the system control unit 50 stores in the system memory 52 information that the increasing/decreasing direction (change direction) of the setting value is the decreasing direction. The information stored only needs to indicate the increasing/decreasing direction of the setting value changed by the touch-move. The system control unit 50 may store the touch-move direction (downward direction) determined in step S1009.

In step S1012, the system control unit 50 increments the setting value of the setting item set as the sub item 807 by 1. For example, when the ISO sensitivity is set to 200, the system control unit 50 changes the ISO sensitivity to 250.

In step S1013, the system control unit 50 stores in the system memory 52 information that the increasing/decreasing direction (change direction) of the setting value is the increasing direction. The information stored only needs to indicate the increasing/decreasing direction of the setting value changed by the touch-move. The system control unit 50 may store the touch-move direction (upward direction) determined in step S1009.

In step S1014, the system control unit 50 starts counting a repetition start timer. The repetition start timer refers to a timer for measuring the required time duration (for example, 1 second) until the repeat-ON state is entered.

In step S1015, the system control unit 50 sets the touch-move state as a control variable stored in the system memory 52 to ON.

In step S1016, when a stationary strong touch timer is being counted, the system control unit 50 stops counting the stationary strong touch timer. The stationary strong touch timer refers to a timer for determining whether the time period during which a touch-move following a touch-push is not performed has reached a predetermined time duration.

In step S1017, the system control unit 50 resets the count of the setting timer via the system timer 53.

Referring to FIG. 4 again, in step S412, the system control unit 50 determines whether the touch-push state has changed. When the touch-push state has changed (YES in step S412), the processing proceeds to step S413. On the other hand, when the touch-push state remains unchanged (NO in step S412), the processing proceeds to step S414.

In step S413, the system control unit 50 performs touch-push processing. The touch-push processing will be described below with reference to FIG. 11.

Figure 11:
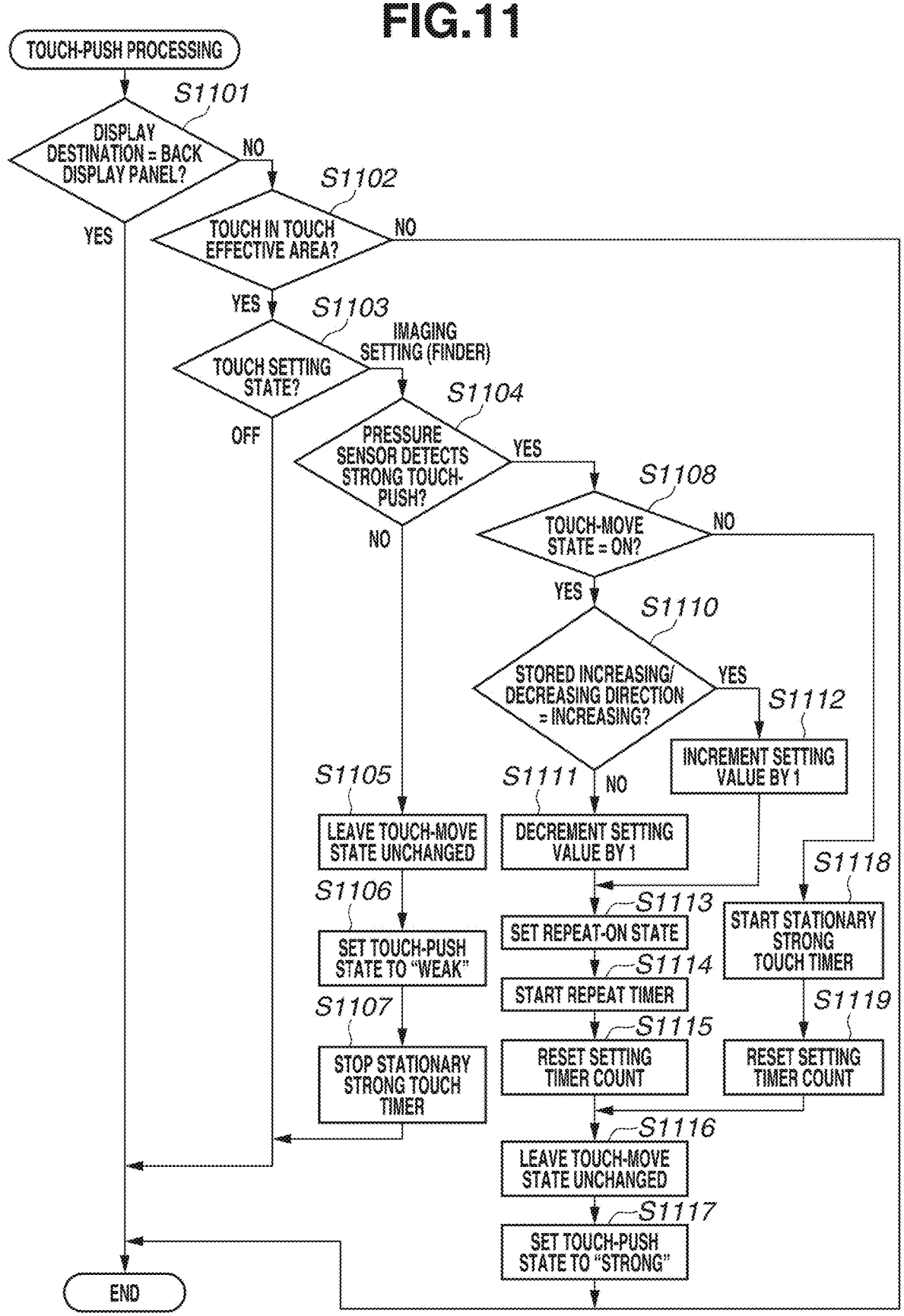
FIG. 11 is a flowchart illustrating in detail an example of a touch-push processing procedure.
Figure 12:
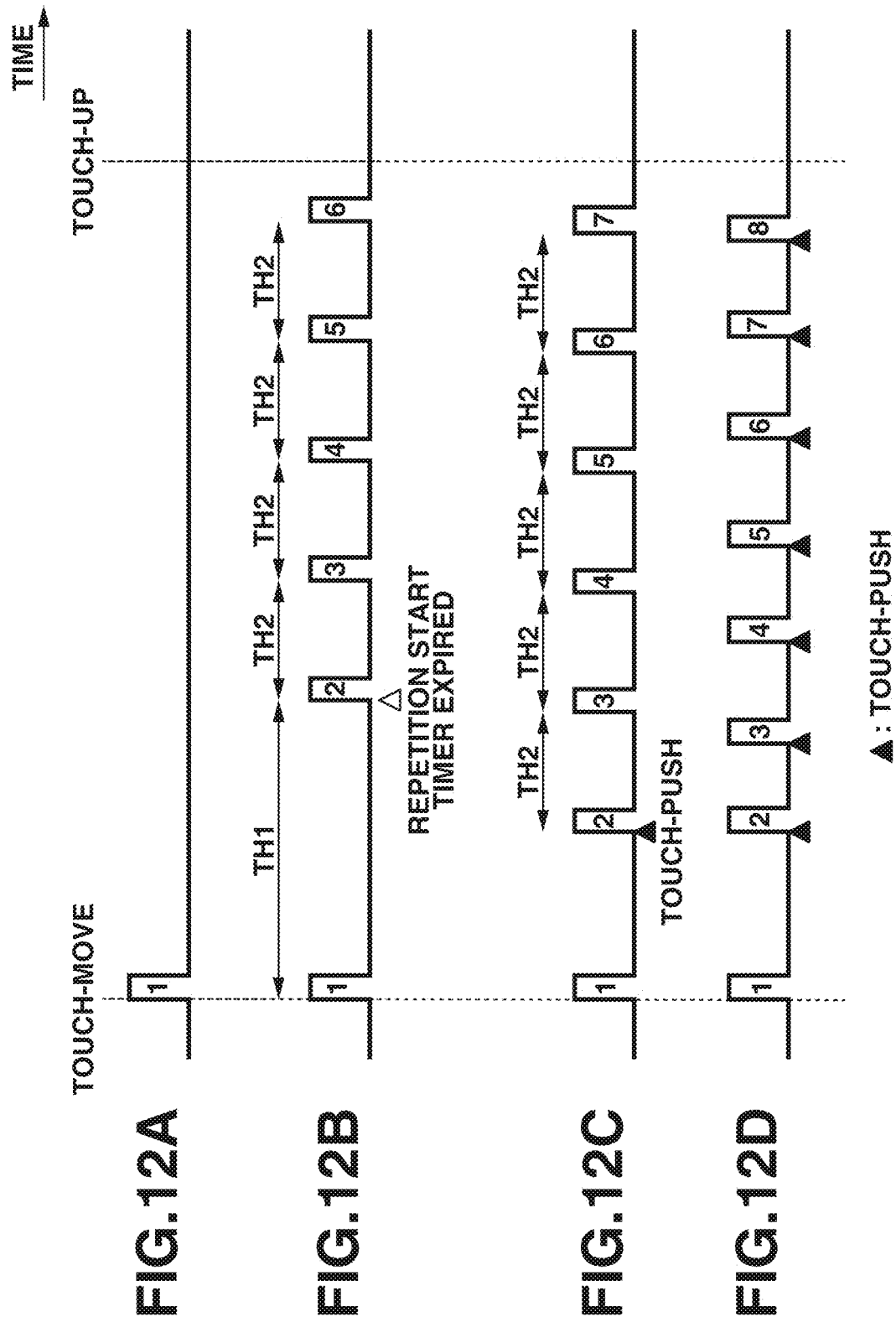
FIGS. 12A to 12D are timing charts illustrating setting value change timings.

FIG. 11 is a flowchart illustrating in detail an example of the touch-push processing procedure in step S413 illustrated in FIG. 4.

In step S1101, the system control unit 50 determines whether the current display destination is the back display panel 28a. When the current display destination is the back display panel 28a (YES in step S1101), the system control unit 50 ends the touch-push processing. On the other hand, when the current display destination is not the back display panel 28a (NO in step S1101), the processing proceeds to step S1102.

In step S1102, the system control unit 50 determines whether the above-described touch effective area set in the menu screen illustrated in FIG. 8E is touched. When the touch effective area is touched (YES in step S1102), the processing proceeds to step S1103. On the other hand, when the touch effective area is not touched (NO in step S1102), the system control unit 50 ends the touch-push processing.

In step S1103, the system control unit 50 determines the touch setting state. When the touch setting state is "OFF" (OFF in step S1103), the system control unit 50 ends the touch-push processing. On the other hand, when the touch setting state is "Imaging Setting (Finder)" (IMAGING SETTING (FINDER) in step S1103), the processing proceeds to step S1104.

In step S1104, the system control unit 50 determines whether a touch-push operation (a touch-push leading to the "Strong" touch-push state) is detected, i.e., whether the pressure sensor 70b detects a pressure equal to or higher than a threshold value. When the system control unit 50 detects a touch-push leading to the "Strong" touch-push state (YES in step S1104), the processing proceeds to step S1108. On the other hand, when the system control unit 50 does not detect a touch-push leading to the "Strong" touch-push state (NO in step S1104), the processing proceeds to step S1105.

In step S1105, the system control unit 50 leaves the touch-move state unchanged.

In step S1106, the system control unit 50 sets the touch-push state to "Weak".

In step S1107, when the stationary strong touch timer is being counted, the system control unit 50 stops counting the stationary strong touch timer.

In step S1108, the system control unit 50 determines whether the touch-move state is "ON". When the touch-move state is "ON" (YES in step S1108), the processing proceeds to step S1110. On the other hand, when the touch-move state is not "ON" (NO in step S1108), the processing proceeds to step S1118. The state where the touch-move state is "ON" refers to a case where the setting value is changed by a touch-move preceding a touch-push in step S1010 or S1012 and then a touch-push is performed without a touch release.

In step S1110, referring to the increasing/decreasing direction of the setting value stored in the system memory 52 in step S1011 or S1013, the system control unit 50 determines whether the stored increasing/decreasing direction is the increasing direction. When the stored increasing/decreasing direction is the increasing direction (YES in step S1110), the processing proceeds to step S1012. On the other hand, when the stored increasing/decreasing direction is not the increasing direction (when the increasing/decreasing direction is the decreasing direction) (NO in step S1110), the processing proceeds to step S1111.

In step S1111, the system control unit 50 decrements the setting value of the setting item set as the sub item 807 by 1. For example, when the ISO sensitivity is set to 160, the system control unit 50 changes the ISO sensitivity to 125.

In step S1112, the system control unit 50 increments the setting value of the setting item set as the sub item 807 by 1. For example, when ISO sensitivity is set to 250, the system control unit 50 changes the ISO sensitivity to 320.

In step S1111 or S1112, when a setting value is changed by a touch-move and then a touch-push is performed without a touch release in this way, the system control unit 50 changes one more setting value in the same direction as the increasing/decreasing direction of the setting value change by the touch-move.

In step S1113, the system control unit 50 changes the status flag stored in the system memory 52 to set the repeat-ON state.

In step S1114, in order to perform an operation for periodically changing a setting value in the repeat-ON state (key repeat state), the system control unit 50 starts counting the repeat timer for measuring the subsequent one period (for example, 0.3 seconds).

When a setting value is changed by a touch-move and then a touch-push is performed without a touch release in this way, the repeat-ON state is immediately entered without waiting for the expiration of the repetition start timer.

In step S1115, the system control unit 50 resets the count of the setting timer via the system timer 53 and then starts the setting timer.

In step S1116, the system control unit 50 leaves the touch-move state unchanged.

In step S1117, the system control unit 50 sets the touch-push state to "Strong".

In step S1118, since a touch-push is performed when the touch-move state is OFF, i.e., when a touch-move is not performed, the system control unit 50 starts counting the stationary strong touch timer. In a case where the setting timer expires and then the touch setting state is set to OFF, the system control unit 50 selects OFF in the determination in step S1103, and therefore does not start counting the stationary strong touch timer (the processing does not proceed to step S1118). More specifically, even if a touch-on by the nose continues until the setting timer expires and then a touch-push is unintentionally performed, the system control unit 50 does not count the stationary strong touch timer, and therefore does not perform the initialization of the setting values in step S429.

In step S1119, the system control unit 50 resets the count of the setting timer via the system timer 53.

Referring to FIG. 4 again, in step S414, the system control unit 50 determines whether a touch-up is performed (when a touch is detected at a plurality of positions, the system control unit 50 determines whether a touch-up is performed at all of the touch positions). When a touch-up is performed at all of the touch points (YES in step S414), the processing proceeds to step S415. On the other hand, when a touch-up is performed at not all of the touch points (NO in step S414), the processing proceeds to step S416.

In step S415, the system control unit 50 sets the touch setting state, the touch-move state, and the touch-push state to OFF (to initialize these states). If one or more timers are being counted for a blind touch operation (a touch operation in the eye-contact state), the system control unit 50 stops counting all of these timers (but does not restart counting the timers). More specifically, if the stationary strong touch timer, the repetition start timer, the repeat timer, and the setting timer are being counted, the system control unit 50 stops counting these timers and then resets the count thereof.

In step S416, the system control unit 50 determines whether the touch setting state is OFF. When the touch setting state is OFF (YES in step S416), the processing proceeds to step S430. On the other hand, when the touch setting state is not OFF, i.e., when the touch setting state is "Imaging Setting (Back)" or "Imaging Setting (Finder) (NO in step S416), the processing proceeds to step S417. In step S417, the system control unit 50 determines whether the setting timer being counted has expired. When the setting timer has expired, i.e., when a predetermined time duration (for example, approximately 5 seconds) has elapsed with no operation since the last operation (YES in step S417), the processing proceeds to step S415. On the other hand, when the predetermined time has not elapsed (NO in step S417), the processing proceeds to step S418.

In step S418, the system control unit 50 determines whether the touch setting state is "Imaging Setting (Finder)". When the touch setting state is "Imaging Setting (Finder)" (YES in step S418), the processing proceeds to step S419. On the other hand, when the touch setting state is not "Imaging Setting (Finder)", i.e., when the touch setting state is "Imaging Setting (Back)" (NO in step S418), the processing returns to step S403.

In step S419, the system control unit 50 determines whether the repeat-ON state is currently set. When the repeat-ON state is currently set (YES in step S419), the processing proceeds to step S422. On the other hand, when the repeat-ON is not currently set (NO in step S419), the processing proceeds to step S420.

In step S420, the system control unit 50 determines whether the repetition start timer has expired. When the repetition start timer has expired, i.e., when a setting value is changed by a touch-move over a predetermined distance or longer through a blind touch operation and then a predetermined time duration (for example, 1 second) has elapsed without a touch release (YES in step S420), the processing proceeds to step S421. On the other hand, when the repetition start timer has not expired (NO in step S420), the processing proceeds to step S430.

In step S421, the system control unit 50 changes the status flag stored in the system memory 52 to set the repeat-ON state.

In step S422, the system control unit 50 determines whether the repeat timer has expired. When the repeat timer has expired, i.e., when a setting value is changed in the repeat-ON state and then the time duration for one period (for example, 0.3 seconds) has elapsed (YES in step S422), the processing proceeds to step S423. On the other hand, when the repeat timer has not expired (NO in step S422), the processing proceeds to step S428.

Processing in steps S423 to S425 is similar to the above-described processing in steps S1110 to S1112 illustrated in FIG. 11, respectively, and redundant descriptions thereof will be omitted. Processing in step S426 is similar to the processing in step S1114 illustrated in FIG. 11, and a redundant description thereof will be omitted.

In step S427, the system control unit 50 starts counting the setting timer via the system timer 53.

In step S428, the system control unit 50 determines whether the time duration currently being measured by the stationary strong touch timer has reached a threshold value. When the measured time duration has reached the threshold value, i.e., when a touch-push operation is performed after a touch-down and before a touch-move and then the "Strong" touch-push state continues for a threshold time duration (for example, 2 seconds) without a touch-move (YES in step S428), the processing proceeds to step S429. On the other hand, when the measured time duration has not reached the threshold value (NO in step S428), the processing returns to step S403.

In step S429, the system control unit 50 changes the setting value of the setting item set as the sub item 807 to the initial value. The initial value of the ISO sensitivity setting is "AUTO". More specifically, by performing a touch-push without a touch-move and continuing this state for a certain time duration, the ISO sensitivity setting can be changed to AUTO (initial value) regardless of the setting value before the change.

In step S430, the system control unit 50 determines whether an operation on the shutter button 61, i.e., a half press (SW1 ON) or full press (SW2 ON) is performed. When an operation on the shutter button 61 is performed (YES in step S430), the processing proceeds to step S431. On the other hand, when an operation on the shutter button 61 is not performed (NO in step S430), the processing proceeds to step S432.

In step S431, when a half press (SW1 ON) on the shutter button 61 is performed, the system control unit 50 performs imaging preparation processing in response to the half press operation. When a full press (SW2 ON) on the shutter button 61 is performed, the system control unit 50 performs imaging processing in response to the full press operation. In the imaging preparation processing, the system control unit 50 performs AF and AE. In AE, when the setting item set as the sub item 807 is an exposure-related setting item, the setting values (ISO sensitivity setting, exposure correction, etc.) are reflected. In the imaging processing, by reflecting various current imaging settings, the imaging unit 22 performs exposure and imaging, and the image processing unit 24 performs a series of imaging processing ranging from image processing on a captured image to recording of the image data in the recording medium 200 as an image file.

In step S432, the system control unit 50 determines whether other operations are performed. When other operations are performed (YES in step S432), the processing proceeds to step S433. In step S433, the system control unit 50 performs processing in response to the other operation. For example, the system control unit 50 changes the shutter speed in response to an operation on the operation unit 70. On the other hand, when other operations are not performed (NO in step S432), the processing proceeds to step S434.

In step S434, the system control unit 50 determines whether an operation for ending the imaging mode processing is performed. Operations for ending the imaging mode processing include an operation for turning power OFF and an operation for changing the imaging mode to other modes such as the reproduction mode. When an operation for ending the imaging mode processing is not performed (NO in step S434), the processing returns to step S403. On the other hand, when an operation for ending the imaging mode processing is performed (YES in step S434), the system control unit 50 ends the imaging mode processing.

According to the above-described processing, in steps S1010 or S1012, the system control unit 50 decreases or increases the setting value, respectively, when the user touches the touch panel 70a and performs a touch-move over the predetermined distance or longer. In step S421, when the user keeps the touch state without a touch release until the repetition start timer expires, the system control unit 50 enters the key repeat state for periodically increasing or decreasing a setting value. In steps S1111 or S1112, even before the repetition start timer expires, performing a touch-push allows further changing the setting value. In step S1113, performing a touch-push allows setting the key repeat state without waiting for the expiration of the repetition start timer. More specifically, both when largely changing a setting value and when fine-tuning the setting value, the user can more quickly set the setting value as the user intends.

FIGS. 12A to 12D are timing charts illustrating setting value change timings.

FIG. 12A is a timing chart for a case where the processing according to the present embodiment is not applied. After the user sets a setting value once with an upward or downward touch-move, the repeat-ON state cannot be entered, and the user cannot change a setting value with a touch-push. Thus, the setting value is not changed any more until a touch-up is made.

FIG. 12B is a timing chart for a case where, after once setting a setting value with an upward or downward touch-move, the user keeps the touch without performing a touch-push according to the present embodiment. After the user sets a setting value once with an upward or downward touch-move, when a predetermined time TH1 (for example, 1 second) until the repetition start timer expires has elapsed, the key repeat state is entered. Then, as long as the user keeps the touch, the setting value is changed at intervals of one period duration TH2 (for example, 0.3 seconds). In an example illustrated in FIG. 12B, the second to sixth setting changes are performed in the key repeat state until a touch-up is made. The second to sixth setting changes are performed in the same increasing/decreasing direction as that for the first setting change. Referring to FIG. 12B, the user can perform larger setting change during a single touch operation from a touch-move to a touch-up, compared with the example illustrated in FIG. 12A.

FIG. 12C is a timing chart for a case where, after once setting a setting value with an upward or downward touch-move, the user performs a touch-push before the repetition start timer expires and then keeps the touch according to the present embodiment. A touch-push is performed before the predetermined time duration TH1 has elapsed since the first setting change. Therefore, the second setting change can be performed at an earlier timing than the timing illustrated in FIG. 12B. Subsequently, the key repeat state is entered, and the setting value is changed at intervals of one period duration TH2 (for example, 0.3 seconds) as long as the user keeps the touch. In an example illustrated in FIG. 12C, the second to seventh setting changes are performed in the key repeat state until a touch-up is made. Referring to FIG. 12C, the user can perform larger setting change during a single touch operation from a touch-move to a touch-up, compared with the example illustrated in FIG. 12B.

FIG. 12D is a timing chart for a case where, after once setting a setting value with an upward or downward touch-move, the user performs a touch-push before the repetition start timer expires and then repetitively performs a touch-push several times according to the present embodiment. Repetitively performing a touch-push more strictly refers to repetitively performing an operation for reducing pressure leading to the "Weak" touch-push state and then increasing pressure leading to the "Strong" touch-push state again. A touch-push is performed before the predetermined time duration TH1 has elapsed since the first setting change. Therefore, the second setting change can be performed at an earlier timing than the timing illustrated in FIG. 12B. Subsequently, the key repeat state is entered. The user repetitively performs a touch-push at intervals of a time duration shorter than the expiration time of the repeat timer (time duration for one key repeat period). In the example illustrated in FIG. 12D, the second to eighth setting changes are performed in response to repetitive touch-pushes until a touch-up is made. As a result, the user can perform larger setting change during a single touch operation from a touch-move to a touch-up, compared with the example illustrated in FIG. 12C. Since this setting change is performed the number of times corresponding to the number of pushes on the touch panel 70a, allowing the user to easily grasp how many times the setting value has been changed. More specifically, the user can quickly and reliably perform setting change.

In the above-described embodiment, when the user changes a setting value through a touch-move over the predetermined distance or longer in a blind touch operation (touch operation in the eye-contact state) and then keeps the touch until the repetition start timer expires, the repeat-ON state (key repeat state) is entered. However, the key repeat state does not need to be entered. More specifically, even when the user performs a touch-move over the predetermined distance or longer in a blind touch operation (touch operation in the eye-contact state) to change a setting value and then keeps the touch, further setting change may not be performed. To implement this processing, the processing in step S1014 illustrated in FIG. 10, and the processing in steps S420 and S421 in FIG. 4 need to be omitted. (When the system control unit 50 selects "NO" in step S419, the processing proceeds to step S430). In this case, the operations according to the timing chart illustrated in FIG. 12A are implemented.

According to the above-described embodiment, when the user performs a touch-move over the predetermined distance or longer in a blind touch operation (touch operation in the eye-contact state) to change a setting value and then performs a touch-push leading to the "Strong" touch-push state, the repeat-ON state is immediately entered. However, the repeat-ON state does not need to be entered. More specifically, even when the user performs a touch-move over the predetermined distance or longer in a blind touch operation (touch operation in the eye-contact state) to change a setting value, performs a touch-push, and then keeps the touch, further setting change may not be performed. To implement this processing, the processing in steps S1113 and S1114 illustrated in FIG. 11 needs to be omitted. Even in this case, repetitively performing a touch-push changes the setting value the number of times corresponding to the number of repetitions, the operations according to the timing chart illustrated in FIG. 12D are implemented. Even in this case, the user can perform larger setting change during a single touch operation from a touch-move to a touch-up, compared with the example illustrated in FIG. 12A. In other words, the user can quickly and reliably perform setting change.

Although, in the above-described embodiment, the same change amount for a single setting change is used both when changing a setting value in response to a touch-move over the predetermined distance or longer (steps S1010 and S1012) and when changing a setting value in response to a touch-push (steps S1111 and S1112), the change amount may be differentiated between the two cases. For example, in steps S1010 and S1012, when changing a setting value in response to a touch-move over the predetermined distance or longer, the setting value is increased or decreased by one change amount. On the other hand, in steps S1111 and S1112, when changing a setting value in response to a touch-push, the change amount for a single setting change may be set larger. For example, in steps S1010 and S1012, when changing the ISO sensitivity setting value in response to a touch-move over the predetermined distance or longer, the setting value is changed in ⅓-stop increments (a first amount) (as illustrated in FIG. 3). In steps S1111 and S1112, when changing the setting value in response to a touch-push, the ISO sensitivity setting value is changed in 1-stop increments (a second amount larger than the first amount). In this case, when the user performs an upward touch-move over the predetermined distance or longer on the ISO sensitivity set to 160, the setting value is changed in ⅓-stop increments in step S1012 and the ISO sensitivity is set to 200. When the user performs a touch-push without a touch release in this state, the setting value is further changed in 1-stop increments and the ISO sensitivity is set to 400 in step S1112.

In steps S1111 and S1112, when changing a setting value in response to a touch-push, the setting value may be changed to a predetermined demarcation setting value out of settable setting value candidates. For example, as a predetermined demarcation setting value, the ISO sensitivity setting value may be changed to the closest value in 1-stop increments from ISO100. In this case, when the user performs an upward touch-move over the predetermined distance or longer on the ISO sensitivity set to 400, the ISO sensitivity is set to 500 in step S1012. When the user performs a touch-push without a touch release from the state, the ISO sensitivity is set to ISO800 which is the closest demarcation position out of the ISO sensitivity values higher than ISO sensitivity 500 in step S1112 (demarcation positions refer to the values marked by circles illustrated in FIG. 3). Subsequently, the setting value is changed between the values marked by circles illustrated in FIG. 3 each time a touch-push is made. On the contrary, when the user performs a downward touch-move over the predetermined distance or longer in the state where the ISO sensitivity is set to 400, the ISO sensitivity is set to 320 in step S1012. When the user performs a touch-push without a touch release from the state, the ISO sensitivity is set to ISO200 which is the closest demarcation position out of the ISO sensitivity values lower than ISO sensitivity 320 in step S1112 (demarcation positions refer to the values marked by circles illustrated in FIG. 3).

In steps S1111 and S1112, when changing the setting value in response to a touch-push, the setting value may be changed to the maximum or the minimum value out of settable setting value candidates. In this case, when the user performs an upward touch-move over the predetermined distance or longer in the state where the ISO sensitivity is set to 400, the ISO sensitivity is set to 500 in step S1012. When the user performs a touch-push without a touch release from the state, the ISO sensitivity is set to HS (51200) as the maximum settable value in step S1112. Subsequently, even if the user performs a touch-push, the setting value is left unchanged since the value cannot be increased any more. On the contrary, when the user performs a downward touch-move over the predetermined distance or longer in the state where the ISO sensitivity is set to 400, the ISO sensitivity is set to 100 as the minimum value or AUTO in step S1012.

Although, in the above-described embodiment, the setting change amount in a single setting change during the repeat time duration is the same in a case where the repeat-ON state is set upon expiration of the repetition start timer without a touch-push (step S421) and in a case where the repeat-ON state is entered upon a touch-push (step S1113), the processing is not limited thereto. The amount of single-time setting change during the repeat time duration in a case where the repeat-ON state is entered upon a touch-push (step S1113) may be larger than that in a case where the repeat-ON state is set upon expiration of the repetition start timer without a touch-push (step S421). For example, the change amount of the ISO sensitivity setting change in a single setting change during the repeat time duration may be ⅓-stop increments in the former case and 1-stop increments in the latter case.

Instead of changing the setting change amount based on the repeat-ON state factor (step S421 or S1113), the setting change amount may be changed based on other factors. For example, the setting change amount may be changed based on whether the touch-push state is "Strong" or "Weak" when periodically changing each setting value upon expiration of the repeat timer in the repeat-ON state. In this case, instead of step S425, the system control unit determines the current touch-push state. When the current touch-push state is "Weak", the system control unit 50 increases the setting value by the first amount (for example, ⅓-stop increments for the ISO sensitivity). When the current touch-push state is "Strong", the system control unit 50 increases the setting value by the second amount (for example, 1-stop increments for the ISO sensitivity). The expiration time (period) of the repeat timer may be changed based on whether the touch-push state is "Strong" or "Weak". The expiration time for "Strong" may be shorter than that for "Weak". Both the single-time setting change amount and the period in the repeat-ON state may be changed based on whether the touch-push state is "Strong" or "Weak". If the touch-push state can be distinguished in three or more steps including the two steps "Strong" and "Weak", at least either one of the single-time setting change amount and the period in the repeat-ON state may be differentiated in multiple steps for each touch-push state (for each pressure).

Although, in the above-described example, the system control unit 50 changes the setting value to the initial value in step S429 when the "Strong" touch-push state set before a touch-move remains still and continues, the processing is not limited thereto. Instead of changing the setting value to the initial value, a changeable setting item may be changed. More specifically, the system control unit 50 may change the setting of the sub item 807 illustrated in FIG. 8B from the ISO sensitivity to exposure correction when the "Strong" touch-push state set before a touch-move remains still and continues.

In the blind touch operation according to the embodiment, the system control unit 50 increases the setting value in response to an upward touch-move over the predetermined distance or longer, and decreases the setting value in response to a downward touch-move over the predetermined distance or longer. More specifically, the system control unit 50 increases or decreases the setting value in response to a touch-move in the upward direction (first direction) or downward direction (second direction) which are mutually opposite directions on the Y axis (first axis). However, the direction is not limited thereto. The system control unit 50 may increase or decrease the setting value in response to a touch-move in the rightward direction (third direction) or leftward direction (fourth direction) which are mutually opposite directions on the X axis (second axis). More specifically, the system control unit 50 may increase the setting value in response to a rightward touch-move over a predetermined distance or longer and decrease the setting value in response to a leftward touch-move over a predetermined distance or longer. Further, the setting value of a different setting item may be changed for each direction. For example, the system control unit 50 may increase the setting value of a first setting item (for example, ISO sensitivity) in response to an upward touch-move over the predetermined distance or longer, and decrease the setting value of the first setting item in response to a downward touch-move over the predetermined distance or longer. On the other hand, the system control unit 50 may increase the setting value of a second setting item (for example, exposure correction) in response to a rightward touch-move over the predetermined distance or longer, and decrease the setting value of the second setting item in response to a leftward touch-move over the predetermined distance or longer.

Although, in the example according to the above-described embodiment, the electronic view finder 28b is used, an optical finder is also applicable.

Although a blind touch operation (a touch operation in the eye-contact state) has been described above as an example of a situation where a setting value is changed in response to a touch-move over the predetermined distance or longer and then the setting value is further changed upon a touch-push, the processing is not limited to the situation. Although, in the above-described example, the present embodiment is applied to an imaging apparatus, the applicable apparatus is not limited thereto. For example, the present embodiment is also applicable to a pressure-detectable touch panel of a smartphone and a pressure-detectable touch pad of a notebook personal computer (PC).

Figure 13:
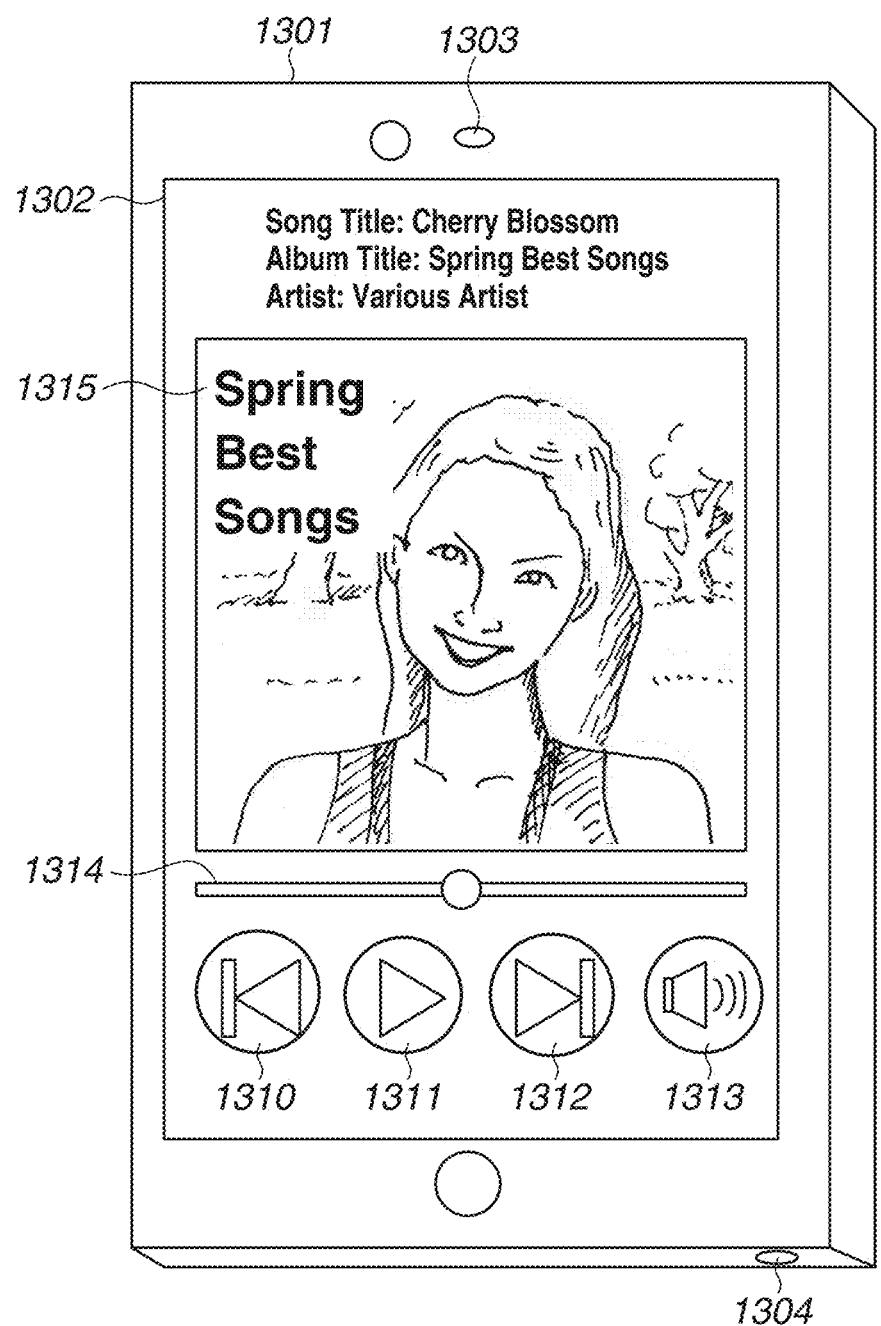
FIG. 13 is a diagram illustrating an example of a display screen on a smartphone.

FIG. 13 illustrates an example of a smartphone (telephone and music player) to which the present embodiment is applicable. A smartphone 1301 is provided with a touch panel 1302 capable of detecting pressure by a finger touch, a speaker 1303, and an audio output terminal 1304. When a music reproduction application (Music Player) is activated on the smartphone 1301, a screen as illustrated in FIG. 13 is displayed. The touch panel 1302 displays touch icons 1310 to 1313, a reproduction seek bar 1314, and an album jacket image 1315. Touching the touch icon 1310 moves the reproduction position to the starting position of the currently reproduced track or to the preceding track. Touching the touch icon 1311 starts or stops the reproduction of the current track. Touching the touch icon 1312 moves the reproduction position to the starting position of the track following the currently reproduced track.

The touch icon 1313 is a sound volume adjustment icon. When the user taps the touch icon 1313 (performs a touch-down and then a touch-up without a touch-move), a sound volume increasing/decreasing bar appears. The user can adjust the sound volume output from the speaker 1303 or the audio output terminal 1304 by operating the sound volume increasing/decreasing bar. When the user performs a touch-down on the touch icon 1313 and then a touch-move over the predetermined distance or longer, the sound volume increases by one step. When the user performs a touch-push without a touch release in this state, the sound volume increases by one more step. The key repeat state is entered at the timing. When the user keeps the touch, the sound volume increases according to the touch duration. When the user repetitively performs a touch-push without a touch release, the sound volume increases each time a touch-push is made. On the contrary, when the user perform a touch-down on the touch icon 1313 and then a downward touch-move over the predetermined distance, the sound volume decreases by one step. When the user performs a touch-push without a touch release in this state, the sound volume decreases by one more step. The key repeat state is entered at the timing. When the user keeps the touch, the sound volume decreases according to the touch duration. When the user repetitively performs a touch-push without a touch release, the sound volume also decreases each time a touch-push is made.

More specifically, it is possible to perform similar control to the control described above centering on the blind touch operation according to the above-described embodiment. The touch effective area according to the embodiment described above with reference to FIGS. 1 to 12A to 12D is used as the response area of the touch icon 1313, and the sound volume represents the setting item subjected to setting change. As long as a touch-down is performed in the response area of the touch icon 1313, the control remains effective even if the touch position moves out of the touch icon 1313 after a touch-move. In this way, the present embodiment is also applicable to an operation on a displayed icon other than a blind touch operation. In this example, if one touch icon 1313 for sound volume control is displayed, the user can quickly and reliably adjust the sound volume to the target sound volume both when increasing the sound volume and when decreasing the sound volume. Further, since it is not necessary to provide two different touch icons for increasing and decreasing the sound volume, a limited space can be effectively utilized. If the entire surface of the touch panel 1302 serves as a touch effective area for sound volume control in a state where the display of the touch panel 1302 is OFF and music is being output, the user can suitably operate the smartphone 1301 without seeing the touch panel 1302 when the smartphone 1301 is put in a pocket or bag. As described above, the amount (step) of sound volume adjustment and the period of key repeat may be differentiated by pressure.

The track to be reproduced can also be changed through a rightward and a leftward touch-move in the display area of the album jacket image 1315. When the user performs a touch-down on the display area of the album jacket image 1315 and then a rightward touch-move over the predetermined distance, the track to be reproduced changes from the current track to the next track, and the reproduction position is set to the starting position of the next track. When the user performs a touch-push without a touch release in this state, the track to be reproduced changes to the next track. The key repeat state is entered at the timing. When the user keeps the touch, the track to be reproduced changes to the subsequent tracks according to the touch duration. Also when the user repetitively performs a touch-push without a touch release, the track to be reproduced changes to the subsequent tracks. On the contrary, when the user performs a touch-down on the display area of the album jacket image 1315 and then a touch-move over the predetermined distance, the track to be reproduced changes from the current track to the preceding track and the reproduction position is set to the starting position of the preceding track. When the user performs a touch-push without a touch release in this state, the track to be reproduced changes to the preceding track. The key repeat state is entered at the timing. When the user keeps the touch, the track to be reproduced changes to the preceding tracks according to the touch duration. Also when the user repetitively performs a touch-push without a touch release, the track to be reproduced changes to the preceding tracks. More specifically, it is possible to perform similar control to the control described above centering on the blind touch operation according to the above-described embodiment. The touch effective area according to the above-described embodiment is used as the display area of the album jacket image 1315, and the track to be reproduced represent the setting item subjected to setting change.

The above-described various control described to be performed by the system control unit 50 may be performed by one hardware component. Alternatively, the entire apparatus may be controlled by a plurality of hardware components which share processing.

While the present disclosure has specifically been described in detail based on an embodiment, the present disclosure is not limited thereto but can be modified in diverse ways without departing from the spirit and scope thereof. The above-described embodiment is to be considered as illustrative and not restrictive of the scope of the present disclosure. Embodiments can be suitably combined.

Although the embodiment has been described above centering on a case where the present disclosure is applied to the digital camera 100 and the smartphone 1301, the embodiment is not limited thereto. The present disclosure is also applicable to an electronic apparatus capable of detecting a touch operation and pressure on a touch operation surface. As described above with reference to the blind touch operation and the application to a touchpad of a notebook PC, the touch operation surface does not necessarily need to have display capability. More specifically, the present disclosure is applicable to a PC, personal digital assistant (PDA), mobile phone terminal, portable image viewer, printer apparatus, digital photo frame, music player, game machine, electronic book reader, tablet terminal, smartphone, projection apparatus, household appliance, onboard apparatus, and so on.

According to the present embodiment, it is possible to more quickly set a setting value as a user intends both when largely changing the setting value and when fine-tuning the setting value.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-111125, filed Jun. 5, 2017, which is hereby incorporated by reference herein in its entirety.

What is claimed is:

1. An electronic apparatus comprising:
    a touch detection unit configured to detect a touch on a touch surface;
    a pressure detection unit configured to detect a pressure on the touch surface; and
    a memory and at least one processor configured to function as:
    a control unit configured to perform control,
    wherein, in response to movement of a touch position, in a first direction, with the touch kept being detected by the touch detection unit, the control unit performs control to change a setting value of a specific setting item in a predetermined direction,
    wherein, in response to movement of the touch position, in a second direction, with the touch kept being detected by the touch detection unit, the control unit performs control to change the setting value of the specific setting item in another direction different from the predetermined direction, and
    wherein, in response to detection of the pressure by the touch after changing the setting value of the specific setting item in the predetermined direction upon movement of the touch position in the first direction, the control unit performs control to further change the setting value of the specific setting item in the predetermined direction, and
    wherein, in a key repeat state which is entered when the touch continues without a touch release for a predetermined time duration after changing the setting value of the specific setting item in the predetermined direction upon movement of the touch position in the first direction, the control unit performs control to further periodically change the setting value of the specific setting item in the predetermined direction by a first amount in the first direction at intervals of a first period shorter than the predetermined time duration while the touch continues.

2. The electronic apparatus according to claim 1, wherein, in response to detection of the pressure by the touch after changing the setting value of the specific setting item in the another direction upon movement of the touch position in the second direction, the control unit performs control to further change the setting value of the specific setting item in the another direction.

3. The electronic apparatus according to claim 2, wherein the predetermined direction is a direction to increase the setting value, and the another direction is a direction to decrease the setting value.

4. The electronic apparatus according to claim 2, further comprising a storage configured to store information indicating whether the touch position has moved in the first direction or in the second direction with the touch kept being detected,
    wherein, in response to detection of the pressure by the touch after the touch position has moved with the touch kept being detected, the control unit performs control to further change the setting value of the specific setting item in a direction that is based on the information indicating whether the touch position has moved.

5. The electronic apparatus according to claim 1, wherein, in response to movement of the touch position over a predetermined distance or longer in the first direction with the touch kept being detected by the touch detection unit, the control unit performs control to change the setting value of the specific setting item in the predetermined direction by the first amount regardless of a moving distance exceeding the predetermined distance.

6. The electronic apparatus according to claim 1, wherein, in the key repeat state which is entered in response to detection of the pressure by the touch even when the touch duration has not reached the predetermined time duration after changing the setting value of the specific setting item in the predetermined direction upon movement of the touch position in the first direction, the control unit performs control to further periodically change the setting value of the specific setting item in the predetermined direction by a first amount in the first direction at intervals of a predetermined period while the touch continues.

7. The electronic apparatus according to claim 6, wherein the predetermined period is the same as the first period.

8. The electronic apparatus according to claim 6, wherein the predetermined period is shorter than the first period.

9. The electronic apparatus according to claim 1, wherein, in response to detection of the pressure by the touch without movement of the touch position after the touch is detected by the touch detection unit, the control unit performs control to change the setting value of the specific setting item in the predetermined direction to a predetermined value.

10. The electronic apparatus according to claim 1, wherein, in response to detection of the pressure by the touch without movement of the touch position after the touch is detected by the touch detection unit, the control unit performs control to execute a function different from changing the setting value of the specific setting item.

11. The electronic apparatus according to claim 10, wherein the function different from changing the setting value of the specific setting item is a function of changing the specific setting item subjected to setting value change from the specific setting item subjected to setting value to another setting item.

12. The electronic apparatus according to claim 1,
wherein, when changing the setting value of the specific setting item in the predetermined direction upon movement of the touch position in the first direction, the control unit performs control to change the setting value of the specific setting item in the predetermined direction by a first amount, and
wherein, when further changing the setting value of the specific setting item in the predetermined direction in response to detection of the pressure by the touch after changing the setting value of the specific setting item in the predetermined direction upon movement of the touch position in the first direction, the control unit performs control to change the setting value of the specific setting item in the predetermined direction by a second amount larger than the first amount.

13. The electronic apparatus according to claim 1,
wherein, in response to movement of the touch position in a third direction with the touch kept being detected by the touch detection unit, the control unit performs control to change the setting value of a second setting item, different from the specific setting item, in a second predetermined direction,
wherein, in response to movement of the touch position in a fourth direction with the touch kept being detected by the touch detection unit, the control unit performs control to change the setting value of the second setting item in another direction different from the second predetermined direction, and
wherein, in response to detection of the pressure by the touch after changing the setting value of the second setting item upon movement of the touch position in the third direction, the control unit performs control to further change the setting value of the second setting item in the second predetermined direction.

14. The electronic apparatus according to claim 13, wherein the first and the second directions are mutually opposite directions on a first axis, and the third and the fourth directions are mutually opposite directions on a second axis different from the first axis.

15. An electronic apparatus comprising:
a touch detection unit configured to detect a touch on a touch surface;
a pressure detection unit configured to detect a pressure on the touch surface; and
a memory and at least one processor configured to function as:
a control unit configured to perform control,
wherein, in response to movement of a touch position, in a first direction, with the touch kept being detected by the touch detection unit, the control unit performs control to change a setting value of a specific setting item in a predetermined direction,
wherein, in response to movement of the touch position, in a second direction, with the touch kept being detected by the touch detection unit, the control unit performs control to change the setting value of the specific setting item in another direction different from the predetermined direction,
wherein, in response to detection of the pressure by the touch after changing the setting value of the specific setting item in the predetermined direction upon movement of the touch position in the first direction, the control unit performs control to further change the setting value of the specific setting item in the predetermined direction, and
wherein, after changing the setting value of the specific setting item in the predetermined direction upon movement of the touch position in the first direction, the control unit performs control to further change the setting value of the specific setting item in the predetermined direction by a specific amount in the predetermined direction at intervals of a first period shorter than the predetermined time each time the pressure by the touch is detected without a touch release.

16. The electronic apparatus according to claim 15, wherein, in response to detection of the pressure by the touch after changing the setting value of the specific setting item in the another direction upon movement of the touch position in the second direction, the control unit performs control to further change the setting value of the specific setting item in the another direction.

17. The electronic apparatus according to claim 16, wherein the predetermined direction is a direction to increase the setting value, and the another direction is a direction to decrease the setting value.

18. The electronic apparatus according to claim 16, further comprising a storage configured to store information indicating whether the touch position has moved in the first direction or in the second direction with the touch kept being detected,
wherein, in response to detection of the pressure by the touch after the touch position has moved with the touch kept being detected, the control unit performs control to further change the setting value of the specific setting item in a direction that is based on the information indicating whether the touch position has moved.

19. An electronic apparatus comprising:
a touch detection unit configured to detect a touch on a touch surface;
a pressure detection unit configured to detect a pressure on the touch surface; and
a memory and at least one processor configured to function as:
a control unit configured to perform control,
wherein, in response to movement of a touch position, in a first direction, with the touch kept being detected by the touch detection unit, the control unit performs control to change a setting value of a specific setting item in a predetermined direction,
wherein, in response to movement of the touch position, in a second direction, with the touch kept being detected by the touch detection unit, the control unit performs control to change the setting value of the specific setting item in another direction different from the predetermined direction,
wherein, in response to detection of the pressure by the touch after changing the setting value of the specific setting item in the predetermined direction upon movement of the touch position in the first direction, the control unit performs control to further change the setting value of the specific setting item in the predetermined direction, and
wherein, when further changing the setting value of the specific setting item in the predetermined direction in response to detection of the pressure by the touch after changing the setting value of the specific setting item in the predetermined direction upon movement of the touch position in the first direction, the control unit performs control to change the setting value of the specific setting item in the predetermined direction to a setting value at a demarcation position existing more in the predetermined direction than the setting value before change.

20. An electronic apparatus comprising:
a touch detection unit configured to detect a touch on a touch surface;
a pressure detection unit configured to detect a pressure on the touch surface;
an approach detection unit configured to detect an approach of an object; and
a memory and at least one processor configured to function as:
a control unit configured to perform control,
wherein, in response to movement of a touch position, in a first direction, with the touch kept being detected by the touch detection unit, the control unit performs control to change a setting value of a specific setting item in a predetermined direction,
wherein, in response to movement of the touch position, in a second direction, with the touch kept being detected by the touch detection unit, the control unit performs control to change the setting value of the specific setting item in another direction different from the predetermined direction,
wherein, in response to detection of the pressure by the touch after changing the setting value of the specific setting item in the predetermined direction upon movement of the touch position in the first direction, the control unit performs control to further change the setting value of the specific setting item in the predetermined direction,
wherein the control unit performs the control in a state where the approach of the object is detected by the approach detection unit, and
wherein, in a case where the approach of the object is not detected by the approach detection unit, the control unit sets the setting value of the specific setting item in the predetermined direction based on the position of the touch detected by the touch detection unit, and does not change the setting value of the specific setting item in the predetermined direction upon detection of movement of the touch position in the first direction with the touch kept being detected by the touch detection unit.

21. A method for controlling an electronic apparatus, the method comprising:
detecting a touch on a touch surface;
detecting a pressure on the touch surface; and
performing control,
wherein, in response to movement of a touch position, in a first direction, with the touch kept being detected, performing control includes performing control to change a setting value of a specific setting item in a predetermined direction,
wherein, in response to movement of the touch position, in a second direction, with the touch kept being detected, performing control includes performing control to change the setting value of the specific setting item in another direction different from the predetermined direction,
wherein, in response to detection of the pressure by the touch after changing the setting value of the specific setting item in the predetermined direction upon movement of the touch position in the first direction, performing control includes performing control to further change the setting value of the specific setting item in the predetermined direction, and
wherein, in a key repeat state which is entered when the touch continues without a touch release for a predetermined time duration after changing the setting value of the specific setting item in the predetermined direction upon movement of the touch position in the first direction, performing control includes performing control to further periodically change the setting value of the specific setting item in the predetermined direction by a first amount in the first direction at intervals of a first period shorter than the predetermined time duration while the touch continues.

22. A non-transitory computer-readable storage medium storing a program causing a computer to perform a method for controlling an electronic apparatus, the method comprising:
detecting a touch on a touch surface;
detecting a pressure on the touch surface; and
performing control,
wherein, in response to movement of a touch position, in a first direction, with the touch kept being detected, performing control includes performing control to change a setting value of a specific setting item in a predetermined direction,
wherein, in response to movement of the touch position, in a second direction, with the touch kept being detected, performing control includes performing control to change the setting value of the specific setting item in another direction different from the predetermined direction,
wherein, in response to detection of the pressure by the touch after changing the setting value of the specific setting item in the predetermined direction upon movement of the touch position in the first direction, performing control includes performing control to further change the setting value of the specific setting item in the predetermined direction, and wherein, in a key repeat state which is entered when the touch continues without a touch release for a predetermined time duration after changing the setting value of the specific setting item in the predetermined direction upon movement of the touch position in the first direction, performing control includes performing control to further periodically change the setting value of the specific setting item in the predetermined direction by a first amount in the first direction at intervals of a first period shorter than the predetermined time duration while the touch continues.

23. A method for controlling an electronic apparatus, the method comprising:
   detecting a touch on a touch surface;
   detecting a pressure on the touch surface; and
   performing control,
   wherein, in response to movement of a touch position, in a first direction, with the touch kept being detected, performing control includes performing control to change a setting value of a specific setting item in a predetermined direction,
   wherein, in response to movement of the touch position, in a second direction, with the touch kept being detected, performing control includes performing control to change the setting value of the specific setting item in another direction different from the predetermined direction,
   wherein, in response to detection of the pressure by the touch after changing the setting value of the specific setting item in the predetermined direction upon movement of the touch position in the first direction, performing control includes performing control to further change the setting value of the specific setting item in the predetermined direction, and
   wherein, after changing the setting value of the specific setting item in the predetermined direction upon movement of the touch position in the first direction, performing control includes performing control to further change the setting value of the specific setting item in the predetermined direction by a specific amount in the predetermined direction at intervals of a first period shorter than the predetermined time each time the pressure by the touch is detected without a touch release.

24. A non-transitory computer-readable storage medium storing a program causing a computer to perform a method for controlling an electronic apparatus, the method for controlling an electronic apparatus, the method comprising:
   detecting a touch on a touch surface;
   detecting a pressure on the touch surface; and
   performing control,
   wherein, in response to movement of a touch position, in a first direction, with the touch kept being detected, performing control includes performing control to change a setting value of a specific setting item in a predetermined direction,
   wherein, in response to movement of the touch position, in a second direction, with the touch kept being detected, performing control includes performing control to change the setting value of the specific setting item in another direction different from the predetermined direction,
   wherein, in response to detection of the pressure by the touch after changing the setting value of the specific setting item in the predetermined direction upon movement of the touch position in the first direction, performing control includes performing control to further change the setting value of the specific setting item in the predetermined direction, and
   wherein, after changing the setting value of the specific setting item in the predetermined direction upon movement of the touch position in the first direction, performing control includes performing control to further change the setting value of the specific setting item in the predetermined direction by a specific amount in the predetermined direction at intervals of a first period shorter than the predetermined time each time the pressure by the touch is detected without a touch release.

25. A method for controlling an electronic apparatus, the method comprising:
   detecting a touch on a touch surface;
   detecting a pressure on the touch surface; and
   performing control,
   wherein, in response to movement of a touch position, in a first direction, with the touch kept being detected, performing control includes performing control to change a setting value of a specific setting item in a predetermined direction,
   wherein, in response to movement of the touch position, in a second direction, with the touch kept being detected, performing control includes performing control to change the setting value of the specific setting item in another direction different from the predetermined direction,
   wherein, in response to detection of the pressure by the touch after changing the setting value of the specific setting item in the predetermined direction upon movement of the touch position in the first direction, performing control includes performing control to further change the setting value of the specific setting item in the predetermined direction, and
   wherein, when further changing the setting value of the specific setting item in the predetermined direction in response to detection of the pressure by the touch after changing the setting value of the specific setting item in the predetermined direction upon movement of the touch position in the first direction, performing control includes performing control to change the setting value of the specific setting item in the predetermined direction to a setting value at a demarcation position existing more in the predetermined direction than the setting value before change.

26. A non-transitory computer-readable storage medium storing a program causing a computer to perform a method for controlling an electronic apparatus, the method comprising:
   detecting a touch on a touch surface;
   detecting a pressure on the touch surface; and
   performing control,
   wherein, in response to movement of a touch position, in a first direction, with the touch kept being detected, performing control includes performing control to change a setting value of a specific setting item in a predetermined direction,
   wherein, in response to movement of the touch position, in a second direction, with the touch kept being detected, performing control includes performing control to change the setting value of the specific setting item in another direction different from the predetermined direction, wherein, in response to detection of the pressure by the touch after changing the setting value of the specific setting item in the predetermined direction upon movement of the touch position in the first direction, performing control includes performing control to further change the setting value of the specific setting item in the predetermined direction, and wherein, when further changing the setting value of the specific setting item in the predetermined direction in response to detection of the pressure by the touch after changing the setting value of the specific setting item in the predetermined direction upon movement of the touch position in the first direction, performing control includes performing control to change the setting value of the specific setting item in the predetermined direction to a setting value at a demarcation position existing more in the predetermined direction than the setting value before change.

* * * * *